US012270308B2

(12) United States Patent
K P et al.

(10) Patent No.: US 12,270,308 B2
(45) Date of Patent: Apr. 8, 2025

(54) VARIABLE FLOWPATH CASINGS FOR BLADE TIP CLEARANCE CONTROL

(71) Applicant: General Electric Company, Schenectady, NY (US)

(72) Inventors: Naveena K P, Bengaluru (IN); Ravindra Shankar Ganiger, Bengaluru (IN); Domala Uma Maheshwar, Bengaluru (IN); Kishore Budumuru, Bengaluru (IN); Kudum Shinde, Bengaluru (IN); Abhishek Goverdhan, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/493,508

(22) Filed: Oct. 24, 2023

(65) Prior Publication Data

US 2024/0052752 A1 Feb. 15, 2024

Related U.S. Application Data

(63) Continuation of application No. 17/899,324, filed on Aug. 30, 2022, now Pat. No. 11,808,157.

(30) Foreign Application Priority Data

Jul. 13, 2022 (IN) ............................ 202211040170

(51) Int. Cl.

*F01D 11/24* (2006.01)
*F01D 25/10* (2006.01)
*F01D 25/24* (2006.01)

(52) U.S. Cl.

CPC .............. *F01D 11/24* (2013.01); *F01D 25/10* (2013.01); *F01D 25/24* (2013.01);
(Continued)

(58) Field of Classification Search

CPC .......... F01D 11/14; F01D 11/16; F01D 11/18; F01D 11/20; F01D 11/24; F05D 2240/11;
(Continued)

(56) References Cited

U.S. PATENT DOCUMENTS

| | | |
|---|---|---|
| 975,450 A | 11/1910 | Seraphin |
| 3,085,398 A | 4/1963 | Frederick |

(Continued)

FOREIGN PATENT DOCUMENTS

| | | | |
|---|---|---|---|
| EP | 2466075 A2 * | 6/2012 | ............. F01D 11/20 |
| FR | 3129428 A1 | 5/2023 | |

(Continued)

OTHER PUBLICATIONS

United States Patent and Trademark Office, "Non-Final Office Action," issued in connection with U.S. Appl. No. 17/889,899, mailed on Sep. 20, 2023, 19 pages.

(Continued)

*Primary Examiner* — David E Sosnowski
*Assistant Examiner* — Maxime M Adjagbe
(74) *Attorney, Agent, or Firm* — HANLEY, FLIGHT & ZIMMERMAN, LLC

(57) ABSTRACT

Disclosed herein are example variable flowpath casings for blade tip clearance control. An example casing for a turbine engine includes an annular substrate extending along an axial direction, the annular substrate including a first surface and a second surface that is radially inward relative to the first surface; an actuator structure coupled to the second surface of the annular substrate; and a smart structure cantilevered from the second surface of the annular substrate, the smart structure including: a support structure, a first region of the support structure coupled to the second surface of the annular substrate, a second region of the support structure coupled to the actuator structure; and a (Continued)

radially inward surface defining a variable surface, the support structure to move the variable surface in a radial direction.

20 Claims, 16 Drawing Sheets

(52) U.S. Cl.
CPC ...... *F05D 2240/11* (2013.01); *F05D 2260/20* (2013.01); *F05D 2260/50* (2013.01); *F05D 2270/821* (2013.01); *F05D 2300/50212* (2013.01)

(58) Field of Classification Search
CPC ............. F05D 2260/50; F05D 2260/20; F05D 2270/821
See application file for complete search history.

(56) References Cited

U.S. PATENT DOCUMENTS

| | | | | |
|---|---|---|---|---|
| 4,482,293 | A | 11/1984 | Perry | |
| 4,596,116 | A | 6/1986 | Mandet et al. | |
| 5,054,997 | A | 10/1991 | Corsmeier et al. | |
| 5,188,507 | A | 2/1993 | Sweeney | |
| 5,203,673 | A | 4/1993 | Evans | |
| 5,362,202 | A | 11/1994 | Derouet et al. | |
| 6,514,041 | B1 | 2/2003 | Matheny et al. | |
| 6,962,482 | B2 | 11/2005 | Tanaka | |
| 7,186,078 | B2 | 3/2007 | Tanaka | |
| 7,189,057 | B2 | 3/2007 | Lee et al. | |
| 7,255,528 | B2 | 8/2007 | Stretton | |
| 7,367,776 | B2 | 5/2008 | Albers et al. | |
| 7,596,954 | B2 | 10/2009 | Penda et al. | |
| 7,625,169 | B2 | 12/2009 | Manzoori | |
| 8,257,029 | B2 | 9/2012 | Habarou et al. | |
| 8,475,118 | B2 | 7/2013 | Mulcaire | |
| 8,678,742 | B2 | 3/2014 | Klingels | |
| 8,834,096 | B2 | 9/2014 | Khanin | |
| 8,939,709 | B2 * | 1/2015 | Nanukuttan | F01D 11/22 60/527 |
| 9,068,471 | B2 | 6/2015 | Klingels | |
| 9,255,489 | B2 | 2/2016 | DiTomasso et al. | |
| 9,371,738 | B2 | 6/2016 | Harris | |
| 9,598,975 | B2 * | 3/2017 | Uskert | F01D 11/22 |
| 9,683,453 | B2 | 6/2017 | Sha et al. | |
| 9,709,713 | B1 | 7/2017 | Chen | |
| 9,752,450 | B2 | 9/2017 | Duguay et al. | |
| 9,845,731 | B2 | 12/2017 | Birnkrant et al. | |
| 9,963,988 | B2 | 5/2018 | Swedowicz et al. | |
| 10,316,682 | B2 | 6/2019 | Vetters et al. | |
| 10,352,329 | B2 | 7/2019 | Nesteroff et al. | |
| 10,364,696 | B2 | 7/2019 | Mrkler | |
| 10,415,419 | B2 | 9/2019 | Sun et al. | |
| 10,753,222 | B2 | 8/2020 | Eastwood et al. | |
| 11,008,882 | B2 | 5/2021 | Dierksmeier | |
| 11,255,214 | B2 | 2/2022 | Prasad et al. | |
| 11,808,157 | B1 | 11/2023 | K P et al. | |
| 12,012,859 | B2 | 6/2024 | Chinta et al. | |
| 2009/0128166 | A1 | 5/2009 | Webster | |
| 2009/0208322 | A1 | 8/2009 | McCaffrey | |
| 2010/0303612 | A1 | 12/2010 | Bhatnagar et al. | |
| 2012/0057958 | A1 | 3/2012 | Klingels | |
| 2012/0063884 | A1 | 3/2012 | Klingels | |
| 2013/0022442 | A1 | 1/2013 | Nanukuttan | |
| 2013/0034423 | A1 | 2/2013 | Adaickalasamy et al. | |
| 2013/0177414 | A1 | 7/2013 | Bonneau et al. | |
| 2014/0064938 | A1 | 3/2014 | Eriksen et al. | |
| 2015/0044044 | A1 | 2/2015 | Sippel | |
| 2015/0218959 | A1 | 8/2015 | Barb et al. | |
| 2016/0102571 | A1 | 4/2016 | Cortequisse et al. | |
| 2016/0177753 | A1 | 6/2016 | Walston et al. | |
| 2016/0281522 | A1 | 9/2016 | Graf et al. | |
| 2016/0356168 | A1 | 12/2016 | Duguay et al. | |
| 2017/0067366 | A1 | 3/2017 | Stricker | |
| 2017/0328230 | A1 | 11/2017 | Virkler | |
| 2018/0209292 | A1 | 7/2018 | Hiernaux | |
| 2019/0048737 | A1 | 2/2019 | Ole et al. | |
| 2019/0128135 | A1 | 5/2019 | Skertic | |
| 2020/0332671 | A1 | 10/2020 | Dierksmeier | |
| 2021/0348519 | A1 | 11/2021 | Lee et al. | |

FOREIGN PATENT DOCUMENTS

| | | | |
|---|---|---|---|
| FR | 3129432 | A1 | 5/2023 |
| FR | 3130879 | A1 | 6/2023 |
| FR | 3130894 | A1 | 6/2023 |
| FR | 3132743 | A1 | 8/2023 |
| JP | 2012202330 | A | 10/2012 |

OTHER PUBLICATIONS

United States Patent and Trademark Office, "Corrected Notice of Allowability," issued in connection with U.S. Appl. No. 17/899,324, mailed on Oct. 5, 2023, 2 pages.

United States Patent and Trademark Office, "Notice of Allowance and Fee(s) Due," issued in connection with U.S. Appl. No. 17/894,881, dated Feb. 8, 2024, 5 pages.

United States Patent and Trademark Office, "Final Office Action," issued in connection with U.S. Appl. No. 17/889,899, dated Apr. 10, 2024, 23 pages.

United States Patent and Trademark Office, "Non-Final Office Action," issued in connection with U.S. Appl. No. 17/899,324, mailed on Mar. 7, 2023, 16 pages.

United States Patent and Trademark Office, "Notice of Allowance and Fee(s) Due," issued in connection with U.S. Appl. No. 17/899,324, mailed on Jun. 22, 2023, 7 pages.

United States Patent and Trademark Office, "Advisory Action," issued in connection with U.S. Appl. No. 17/889,899, dated Jun. 18, 2024, 3 pages.

United States Patent and Trademark Office, "Non-Final Office Action," issued in connection with U.S. Appl. No. 17/894,881, dated Sep. 20, 2023, 9 pages.

United States Patent and Trademark Office, "Non-Final Office Action," issued in connection with U.S. Appl. No. 18/657,420, dated Sep. 10, 2024, 10 pages.

United States Patent and Trademark Office, "Non-Final Office Action," issued in connection with U.S. Appl. No. 17/889,899, dated Oct. 1, 2024, 18 pages.

* cited by examiner

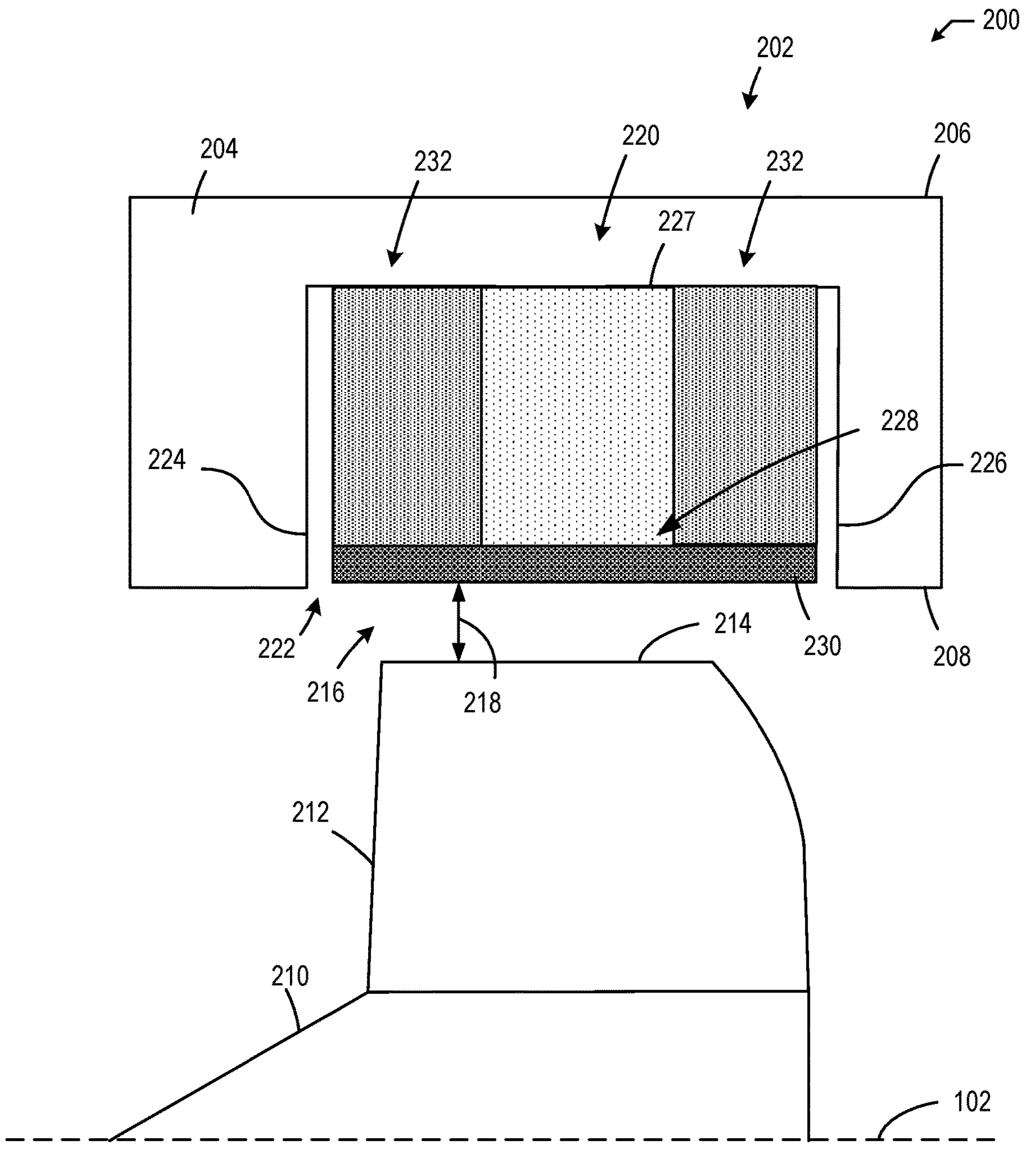
FIG. 2
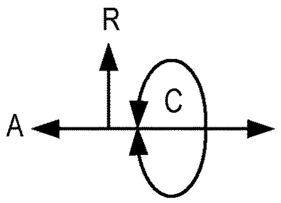

VARIABLE FLOWPATH CASINGS FOR BLADE TIP CLEARANCE CONTROL

RELATED APPLICATIONS

This patent arises from a continuation of U.S. patent application Ser. No. 17/899,324 (now U.S. Pat. No. 11,808, 157), filed on Aug. 30, 2022, which claims the benefit to Indian Provisional Patent Application No. 202211040170, filed on Jul. 13, 2022. U.S. patent application Ser. No. 17/899,324 and Indian Provisional Patent Application No. 202211040170 are hereby incorporated herein by reference in their entireties. Priority to U.S. patent application Ser. No. 17/899,324 and Indian Provisional Patent Application No. 202211040170 is hereby claimed.

FIELD OF THE DISCLOSURE

This disclosure relates generally to turbine engines and, more particularly, to casings of turbine engines.

BACKGROUND

A turbine engine, also referred to herein as a gas turbine engine, is a type of internal combustion engine that uses atmospheric air as a moving fluid. A turbine engine generally includes a fan and a core arranged in flow communication with one another. As atmospheric air enters the turbine engine, rotating blades of the fan and the core impel the air downstream, where the air is compressed, mixed with fuel, ignited, and exhausted. Typically, at least one casing or housing surrounds the turbine engine.

BRIEF DESCRIPTION OF THE DRAWINGS

FIG. 2 is a partial cross-sectional view of an example fan including an example variable flowpath casing constructed in accordance with the teachings of this disclosure.

Figure 1:
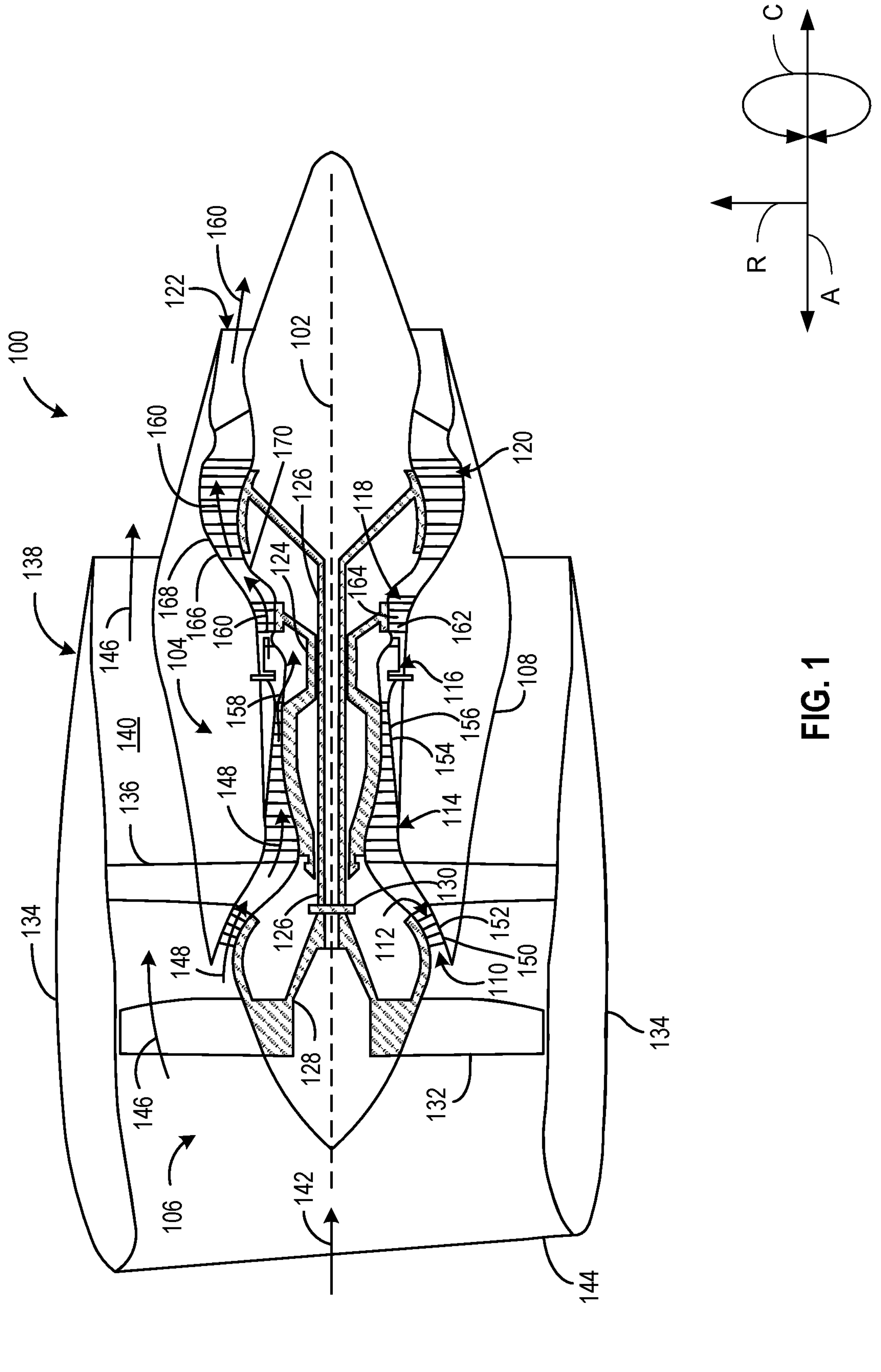
FIG. 1 is a cross-sectional view of an example gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this disclosure, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second. In some examples used herein, the term "substantially" is used to describe a relationship between two parts that is within three degrees of the stated relationship (e.g., a substantially same relationship is within three degrees of being the same, a substantially flush relationship is within three degrees of being flush, etc.). In some examples used herein, the term "substantially" is used to describe a value that is within 10% of the stated value.

In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or end-points defining range(s) of values.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

Turbine engines are some of the most widely-used power generating technologies, often being utilized in aircraft and power-generation applications. A turbine engine generally includes a fan positioned forward of a core, which includes, in serial flow order, a compressor section (e.g., including one or more compressors), a combustion section, a turbine section (e.g., including one or more turbines), and an exhaust section. A turbine engine can take on any number of different configurations. For example, a turbine engine can include one or more compressors and turbines, single or multiple spools, ducted or unducted fans, geared architectures, etc. In some examples, the fan and a low pressure compressor are on the same shaft as a low pressure turbine and a high pressure compressor is on the same shaft as a high pressure turbine.

In operation, rotating blades of the fan pull atmospheric air into the turbine engine and impel the air downstream. At least a portion of the air enters the core, where the air is compressed by rotating blades of a compressor, combined with fuel and ignited to generate a flow of a high-temperature, high-pressure gas (e.g., hot combustion gas), and fed to the turbine section. The hot combustion gases expand as they flow through the turbine section, causing rotating blades of the turbine(s) to spin and produce a shaft work output(s). For example, rotating blades of a high pressure turbine can produce a first shaft work output that is used to drive a first compressor, while rotating blades of a low pressure turbine can produce a second shaft work output that is used to drive a second compressor and/or the fan. In some examples, another portion of the air bypasses the core and, instead, is impelled downstream and out an exhaust of the turbine engine (e.g., producing a thrust).

Typically, a turbine engine includes one or more casings that surround components of the turbine engine and define a flow passage for airflow through the turbine engine. For example, the turbine engine can include fan casing that surrounds rotor blades of the fan and one more core casings that surround rotor blades of the compressor section and/or the turbine section. A distance between a tip of a rotor blade (e.g., a rotating blade such as a fan blade, a compressor blade, etc.) and a respective casing(s) is referred to as a tip clearance. In operation, the casing(s) and rotor blades experience a variety of loads that influence tip clearance, such as thermal loads, pressure loads, and/or mechanical loads. Rotor blades are typically made of a material different than that of a casing surrounding the rotor blades. A rotor blade(s), for example, may be manufactured using a metal (e.g., titanium, aluminum, lithium, etc. and/or a combination thereof), whereas a casing surrounding the fan blade(s) can be made of a composite material. Thus, in some such examples, the fan blade(s) and the casing expand at different rates based on a coefficient of thermal expansion of their respective materials. For example, in response to relatively a low ambient temperature during operation, metal rotor blades may contract at a higher rate than a composite case surrounding the rotor blades (e.g., based on differential thermal expansion), resulting in tip clearance opening.

Over a time period of engine operation, tip clearance can transition between a relatively large clearance and a relatively small clearance due to rotor growth and casing growth (e.g., through rotational speed of a rotor, thermal expansion of the rotating components and the casing, etc.). These transitions can negatively impact the operability and performance of the turbine engine. In some instances, tip clearance between a rotor blade and a casing can be substantially non-existent, allowing the rotor blade(s) to rub against the casing (e.g., referred to herein as blade tip rubbing). Blade tip rubbing can result in damage to the casing, the blade, and/or another component of the turbine engine. A relatively large tip clearance, on the other hand, can result in performance losses. For example, a relatively large tip clearance can increase transient loss of component efficiencies, lead to compressor and/or fan instabilities such as stall and surge, and/or result in tip leakage flow. Tip leakage flow as disclosed herein refers to air flow losses in a region of the casing associated with a rotor blade tip (e.g., a tip region).

The flow field of air in the tip region (e.g., fan blade tip region, compressor blade tip region) is relatively complex due to generation of vortical structures by interaction of the axial flow with the rotor blades and a surface (e.g., of the casing) near the rotor blade tips. In the fan, for example, as tip clearance between a fan blade and a fan case increase, several vortices in the tip region are generated (e.g., tip leakage, separation and induced vortices). These interactions can lead to substantial aerodynamic loss in the fan and decreased efficiency of the turbine engine. An amount of air that leaks past the rotor blades without passing through the rotor blades can have significant effects on turbine engine performance and fuel efficiency. Thus, performance of the fan is closely related to its tip leakage mass flow rate and level of tip and casing interactions. In the compressor section, interactions of tip leakage flow with the mainstream flow and other secondary flows can lead to decreased efficiency and negatively impact compressor stability. In some examples, tip flow leakage can result in compressor and/or fan instabilities such as stall and surge. Compressor and/or fan stall is a circumstance of abnormal airflow resulting from the aerodynamic stall of the rotor blades within the respective component, which causes the air flowing through the component to slow down or stagnate. Compressor and/or fan surge refers to a stall that results in the disruption (e.g., complete disruption, partial disruption, etc.) of the airflow through the respective component.

Based on the foregoing, at least one factor that determines performance of a turbine engine is tip clearance associated with a fan and/or a compressor. Typically, turbine engine performance increases with a smaller tip clearance (e.g., approximately 20 mils in some examples) to minimize air loss or leakage around the blade tip. If close tip clearances (e.g., 20 mils to 40 mils) are not maintained, a loss of performance will be noticed in pressure capability and airflow. However, tip clearance that is too small (e.g., resulting in blade tip rubbing) can result in damage to the casing, the blade, and/or another component of the turbine engine. Thus, an ability to control (e.g., manage) tip clearance during operation of a turbine engine can be important for aerodynamic performance of a turbine engine.

Examples disclosed herein enable manufacturing of an example variable flowpath casing having a variable flowpath component that provides for blade-tip-to-case clearance control. The variable flowpath component(s), which provides a flexible casing flowpath above a blade tip, can be used to control blade-tip-to-case clearance by adjusting a casing flowpath surface during operation. In some examples, the desired tip clearance is approximately between 20 mils and 40 mils. Controlled tip clearance between a rotor blade and a casing can be a challenge due to differential thermal expansion of the rotor blade(s) material and casing material. Certain examples disclosed herein provide a system level architecture for blade tip clearance control based on an example smart structure that expands and/or contracts in response to a temperature change. Certain example variable flowpath casings include an example outer substrate (e.g., shell, casing, etc.) that surrounds an example variable flowpath component(s).

Examples disclosed herein can implement an example mechanical actuation system that includes a plurality of variable flowpath components to control clearance between a rotor blade(s) tip and a casing surrounding the rotor blade(s). Example variable flowpath components disclosed herein include an example smart support structure that can be manufactured using an example smart material such as a shape memory alloy (SMA), a bi-metallic material, and/or another material otherwise associated with a relatively high coefficient of thermal expansion (CTE). The CTE corresponds to a fractional growth of a material per degree change in temperature. Materials are typically associated with a CTE that can be used to predict growth (e.g., expansion) of a material in response to a known temperature change. A relatively high CTE indicates that a material will expand more per degree of temperature increase than a lower CTE.

Certain example variable flowpath components implement an example passive clearance control (PCC) system that provides blade-tip-to-casing clearance control based on ambient air and/or other ambient stimuli. For example, passively controlled variable flowpath components can include a smart structure in fluid communication with ambient air. In some such examples, the smart structure can expand and/or contract in response to a temperature change in the ambient air surrounding the smart structure and/or an adjacent rotor blade(s).

Certain example variable flowpath components include an axially constrained support structure operatively coupled to an example smart structure that is made of a material having a relatively high CTE. For example, the support structure (e.g., sectored wishbone structure) can include an example first wishbone structure and an example second wishbone structure coupled at a radially inward region and a radially outward region. The smart structure can be operatively coupled to the wishbone structures at a position between the radially inward and radially outward regions. A temperature change in ambient air surrounding the example variable flowpath component can cause the smart structure to expand (e.g., in response to an increase in temperature) or contract (e.g., in response to a decrease in temperature), causing a force on the support structure. In some examples, the smart structure expands, causing an axial pushing force on the axially constrained wishbone structures. Such force on the support structure can cause the support structure to adjust in height, causing a radially inward variable surface of the support structure to move in a radially inward direction (e.g., to reduce tip clearance). In some examples, the smart structure contacts, causing an axial pulling force on the wishbone structures. Such force on the support structure can cause the support structure to reduce in height, pulling the variable surface of the support structure in a radially outward direction (e.g., to increase tip clearance).

Certain example variable flowpath components include an example shroud segment(s) coupled to an example smart support structure(s) that is made of a material having a negative coefficient of thermal expansion (NCTE). In some examples, the shroud segment(s) implement an example variable surface that moves based on expansion and/or contraction of the smart support structure. Typically, materials are associated with a positive CTE and, thus, expand when heated and contract when cooled. However, materials associated with a NCTE expand when cooled and contract when heated. In some examples, ambient air increases in temperature during operation of a turbine engine, causing rotor blades to expand and rotor blade tips to move radially outward towards the example shroud segment. In some such examples, the example smart support structure contracts in response to the temperature increase, causing the variable surface to move radial inward as the rotor blade tips move radially outward to maintain tip clearance. In some examples, ambient air decreases in temperature during operation of the turbine engine. In some such examples, the rotor blades contract (e.g., causing the rotor blade tips to move radially inward) while the smart support structure expands (e.g., causing the variable surface of the shroud segment(s) to move radially inward) to maintain a tight tip clearance.

Certain example variable flowpath component(s) include an example shroud segment(s) coupled to an example smart structure(s) system that includes positive CTE materials and NCTE materials structured to amplify radial motion of the shroud segment(s). For example, the shroud segment(s) can be circumferentially coupled to example NCTE lever arms that expand in when cooled and contract when heated. In some examples, the NCTE lever arms can be coupled to radial linkages that are coupled to an outer substrate and extend radially inward. For example, the NCTE lever arms can be coupled to example outer radial linkages that are made of a NCTE material and to inner radial linkages that are made of a positive CTE material. As ambient air surrounding the variable flowpath component increases, the outer radial linkages contract as the inner radial linkages expand, causing the lever arms to rotate and move the shroud segment(s) radially inward to decrease tip clearance. As ambient air surrounding the variable flowpath component decreases, the outer radial linkages expand as the inner radial linkages contract, causing the lever arms to rotate and move the shroud segment(s) radially outward to increase tip clearance.

Certain example variable flowpath components implement an example active Clearance Control (ACC) system that provides blade-tip-to-casing clearance control based on a temperature changed caused by an external source. Certain ACC systems include an example sensor (e.g., proximity sensor, etc.) to identify tip clearance (e.g., in real time). In some examples, the sensor(s) is communicatively coupled to an example controller system (e.g., a full-authority digital engine control (FADEC) system, electric controller, etc.) that monitors active tip clearance and responds upon detection of a tip clearance outside of a defined (e.g., threshold) range of desired (e.g., acceptable) tip clearance values. For example, a proximity sensor can be positioned on an example variable flow casing at a blade tip region to identify real time tip clearance and communicate with a controller system to maintain a desired tip clearance. In response to identifying non-compliant tip clearance, the controller system can cause actuation of a heating element.

Certain variable flowpath components include an example heating element structured to increase a temperature of an example smart structure. In some examples, the heating element can be an induction coil surrounding the smart structure. In some such examples, a controller system can cause the induction coil to increase a temperature of the smart structure. In response to the increase in temperature, the smart structure can expand, causing an example support structure to increase in height, moving an example variable surface radially inward to reduce tip clearance.

In some examples, the heating element can be a supply (e.g., an inflow) of a relatively hot fluid (e.g., lube, oil, bleed air, etc.) as compared to a temperature of the smart structure. In some such examples, a controller system can cause an inflow of the hot fluid to enter an example radially orientated smart structure that is coupled to an example shroud segment (e.g., a sleeve). In response, the smart structure can expand in a radially inward direction, causing the shroud segment to move radially inwards (e.g., to reduce a tip clearance). Thus, certain example variable flowpath components are configured for radial movement by thermal expansion of the smart material to maintain a desired tip clearance.

Examples disclosed herein can be used to prevent blade tip rubs on a variable flow casing, thus reducing the chances of rotor blade tip and/or casing abradable material damage or destruction. Certain examples reduce costs (e.g., maintenance costs) of rotor blades due to tip loss and casing abradable repair. As fan casing sizes grow with growing fan sizes, examples disclosed herein can reduce manufacturing, assembly, and/or maintenance efforts.

Certain examples include an example layer of abradable material applied (e.g., coupled) to a variable surface to mitigate blade tip rubbing issues. Certain example variable flowpath components include a honeycomb structure and/or a damper. Certain examples can thus serve a dual purpose by also acting as a compliant structure to absorb more energy and withstand increased impact load during a blade-out event. A blade-out event refers to an unintentional release of a rotor blade during operation. Structural loading can result from an impact of the rotor blade on a casing (e.g., shroud) and from the subsequent unbalance of the rotating components. Certain examples can thus reduce damage to a variable flowpath casing (e.g., for a fan, compressor, etc.) under an impact load.

Examples disclosed herein are discussed in connection with a variable flowpath casing for a fan section (e.g. single stage fans, multi-stage fans, open rotor/unducted fans, etc.) of a turbine engine. It is understood that examples disclosed herein for the variable flowpath casing having the variable flowpath component may additionally or alternatively be applied to other sections of the turbine engine, including a compressor section and turbine section. Though examples disclosed herein are discussed in connection with a turbofan jet engine, it is understood that examples disclosed herein can be implemented in connection with a turbojet jet engine, a turboprop jet engine, a combustion turbine for power production, or any other suitable application.

Referring now to the drawings, wherein identical numerals indicate the same elements throughout the figures, FIG. 1 is a schematic cross-sectional view of an example high-bypass turbofan-type gas turbine engine 100. While the illustrated example is a high-bypass turbofan engine, the principles of the present disclosure are also applicable to other types of engines, such as low-bypass turbofans, turbojets, turboprops, etc. As shown in FIG. 1, the turbine engine 100 defines a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

In general, the turbine engine 100 includes a core turbine or gas turbine engine 104 disposed downstream from a fan (e.g., fan section) 106. The core turbine 104 includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 can also couple to a fan spool or shaft 128 of the fan 106. In some examples, the LP shaft 126 is coupled directly to the fan shaft 128 (e.g., a direct-drive configuration). In alternative configurations, the LP shaft 126 can couple to the fan shaft 128 via a reduction gear 130 (e.g., an indirect-drive or geared-drive configuration).

As shown in FIG. 1, the fan 106 includes a plurality of fan blades 132 coupled to and extending radially outwardly from the fan shaft 128. An annular fan casing or nacelle 134 circumferentially encloses the fan 106 and/or at least a portion of the core turbine 104. The nacelle 134 can be supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbine engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where the air 158 mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof. A turbine frame 170 with a fairing assembly is located between the HP turbine 118 and the LP turbine 120. The turbine frame 170 acts as a supporting structure, connecting a high-pressure shaft's rear bearing with the turbine housing and forming an aerodynamic transition duct between the HP turbine 118 and the LP turbine 120. Fairings form a flow path between the high-pressure and low-pressure turbines and can be formed using metallic castings (e.g., nickel-based cast metallic alloys, etc.).

Along with the turbine engine 100, the core turbine 104 serves a similar purpose and is exposed to a similar environment in land-based gas turbines, turbojet engines in which the ratio of the first portion 146 of the air 142 to the second portion 148 of the air 142 is less than that of a turbofan, and unducted fan engines in which the fan 106 is devoid of the nacelle 134. In each of the turbofan, turbojet, and unducted engines, a speed reduction device (e.g., the reduction gear 130) can be included between any shafts and spools. For example, the reduction gear 130 is disposed between the LP shaft 126 and the fan shaft 128 of the fan 106.

As described above with respect to FIG. 1, the turbine frame 170 is located between the HP turbine 118 and the LP turbine 120 to connect the high-pressure shaft's rear bearing with the turbine housing and form an aerodynamic transition duct between the HP turbine 118 and the LP turbine 120. As such, air flows through the turbine frame 170 between the HP turbine 118 and the LP turbine 120.

FIG. 2 is a schematic cross-sectional illustration of an example fan 200 of an example turbine engine (e.g., turbine engine 100 of FIG. 1) above an axial centerline (e.g., centerline axis 102), including an example variable flowpath casing 202 constructed in accordance with the teachings of this disclosure. The variable flowpath casing 202 defines at least one flowpath for air that flows through the turbine engine 100. The variable flowpath casing 202 includes an example first (e.g., outer) substrate 204, which is an annular substrate that extends along an axial direction to surround and/or house the fan 200. In some examples, the outer substrate 204 implements substrate means. The outer substrate 204 has a thickness defined by a distance from an outer surface 206 of the outer substrate 204 towards in inner surface 208 of the outer substrate 204. In some examples, the inner surface 208 changes radius along the axial direction, sloping radially inward along the axial direction. In additional or alternative examples, the inner surface 208 may slope radially outward along the axial direction and/or may maintain a constant radius along the axial direction.

The fan 200 of FIG. 2 includes an example shaft 210 and an example rotor blade(s) 212. While one rotor blade 212 is the illustrated in FIG. 2, the fan 200 includes an array of rotor blades 212 that are spaced circumferentially around the shaft 210, extending radially outwards towards the variable flowpath casing 202. The rotor blade(s) 212 includes an example rotor blade tip 214 at a radially outward portion of the rotor blade 212. In operation, the rotor blades 212 spin in a circumferential direction to impel air downstream. The variable flowpath casing 202 circumferentially surrounds the rotor blades 212.

An example blade tip region 216 of the variable flowpath casing 202 is illustrated at a region of the variable flowpath casing 202 at the rotor blade tip 214. The blade tip region 216 is associated with an example tip clearance 218, defined by a distance between the rotor blade tip 214 and the blade tip region 216 of the variable flowpath casing 202. During operation of the turbine engine 100, the variable flowpath casing 202 experiences significant loads that influence the blade tip region(s) 216 and more specifically, the tip clearance 218. For example, the tip clearance 218 between the rotor blade tip 214 and the blade tip region 216 of the variable flowpath casing 202 can transition between a relatively large clearance and relatively small clearance. In some examples, a relatively large clearance may be between 4% to 10% of the axial cord. A relatively small (e.g., substantially non-existent) clearance can allow the rotor blade tip 214 to rub against the blade tip region 216 of the variable flowpath casing 202. Further, the changes in tip clearance 218 may affect the airflow through the turbine engine 100 resulting in performance losses and/or stalls (e.g., fan stall, compressor stall, etc.) by allowing air to bypass the rotor blades 212. Accordingly, the variable flowpath casing 202 includes an example variable flowpath component (e.g., mechanism, surface, ring, system, etc.) 220 structured in accordance with the teachings of this disclosure to control blade-tip-to-casing clearance.

The variable flowpath component 220, examples of which are discussed in detail below, is a mechanical actuation system that implements an example variable flowpath surface that can adjust with rotor and/or casing changes during operation to increase performance of a fan 106, 200, a compressor section, and/or, more generally, the turbine engine 100. In some examples, the variable flowpath component 220 implements actuation means. The variable flowpath component 220 of FIG. 2 resides at least partially within an example trench (e.g., cavity, opening, etc.) 222 of the outer substrate 204. The example trench 222 is at the blade tip region 216 of the variable flowpath casing 202. The example trench 222 extends axially from a forward end 224 of the trench 222 (e.g., positioned forward of a rotor blade 212) towards an aft end 226 of the trench 222 (e.g., positioned aft of the rotor blade 212). In some examples, the trench 222 includes a depth that extends from the inner surface 208 of the outer substrate 204, radially inwards towards an example trench ceiling 227 (e.g., between the inner surface 208 and the outer surface 206 of the outer substrate 204). In some examples, the variable flowpath casing 202 includes more than one trench 222. For example, the variable flowpath casing 202 can include an additional or alternative trench(es) 222 at another tip region of the fan 200 and/or at a tip region(s) of an array(s) of compressor rotor blades. In some examples, a portion of the outer substrate 204 can include a facesheet, a honeycomb layer, and/or other components that provide structure, damping, etc.

The variable flowpath component 220 includes an example variable surface 228, which is a radially inward-most surface of the variable flowpath component 220. In some examples, the variable surface 228 implements variable surface means. In operation, the variable flowpath component 220 is structured to move radially the variable surface 228 radially inwards to reduce a tip clearance 218 and/or radially outwards to increase a tip clearance 218 (e.g., to prevent tip rubbing of the rotor blade tip 214 and variable flowpath casing 202). In some examples, the variable flowpath component 220 includes an example abradable layer 230 at a portion of the variable flowpath component 220 near the rotor blade tip(s) 214. In some such examples, the abradable layer 230 is part of the variable surface 228. In some examples, the abradable layer 230 implements variable surface means. The abradable layer 230 can be at least one layer of an abradable material (e.g., rubber, nickel-aluminum, etc.) coupled (e.g., applied) to the variable surface 228. For example, the abradable layer 230 can be rub strips coupled to the variable surface 228. In some examples, the abradable layer 230 is a layer of abradable material coated (e.g., sprayed, deposited, and/or otherwise coated) onto the variable surface 228.

In some examples, such as the illustrated example of FIG. 2, the variable flowpath casing 202 includes an example trench filler 232, which is structured to fill an area(s) of the trench 222 that is not occupied by the example variable flowpath component 220. For example, the trench filler 232 can be a homogenous core and/or a structure (e.g., a honeycomb structure, corrugated structure, etc.). In some examples, as in the illustrated example of FIG. 2, the trench filler 232 is axially adjacent the variable flowpath component(s) 220. In additional or alternative examples, the trench filler can be circumferentially adjacent the variable flowpath component(s) 220. In some examples, the trench filler 232 is Kevlar®-based. The trench filler 232 can serve one or more functions, such as supplying support, facilitating damping of vibrations, etc.

Various variable flowpath components for an example variable flowpath casing(s) 202 are described in further detail below. The example variable flowpath components disclosed below are applied to the example turbine engine 100 of FIGS. 1-2. As such, the details of the parts (e.g., rotor blade tip 214, blade tip region 216, tip clearance 218, outer substrate 204, trench 222, etc.) are not repeated in connection with FIGS. 3-31. Further, the same reference numbers used for the structures shown in FIG. 2 are used for similar or identical structures in FIGS. 3-31. Examples disclosed below are applied to the example fan 200 of the example turbine engine 100 as described in FIGS. 1-2. It is understood, however, that examples disclosed herein may be implemented in additional or alternative fans. Further, examples disclosed herein may be implemented in one or more core engine casings, such as at a compressor section, turbine section, etc. Further, examples disclosed herein may be applied to a variety of turbine engines, such as a multi-spool turbine engine, a turboshaft engine, turbine engines with one compressor section, etc.

Figure 3:
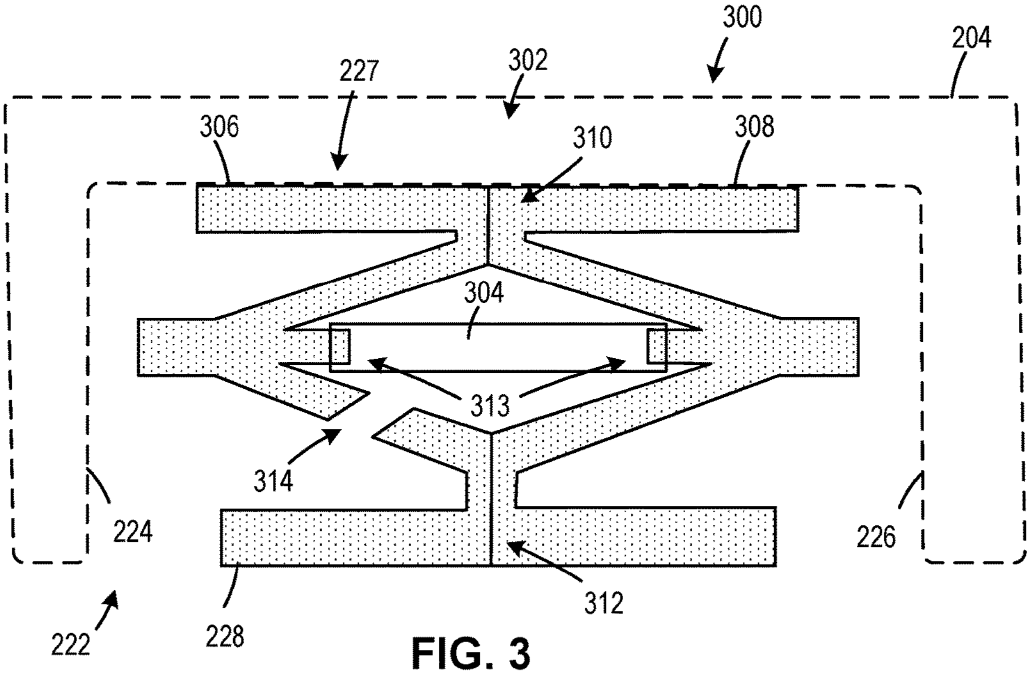
FIG. 3 is a schematic illustration of an example variable flowpath component for a variable flowpath casing constructed in accordance with the teachings of this disclosure.

FIG. 3 is a schematic cross-sectional view of an example variable flowpath component(s) 300 for an example variable flowpath casing 202 constructed in accordance with the teachings of this disclosure. The variable flowpath component(s) 300 of FIG. 3 implements an example mechanical actuation system for blade-tip-to-casing clearance control. The variable flowpath component 300 is a passive system that actuates based on a temperature of ambient air surrounding the variable flowpath component 300. In some examples, the variable flowpath component 300 implements actuation means. The variable flowpath component 300 of FIG. 3 includes an example support structure 302 and an example actuator bar 304 (e.g., actuator structure) operatively coupled to the support structure 302.

The example support structure 302 is configured to move in a radial direction to adjust tip clearance 218 (not illustrated in FIG. 3) during operation of the turbine engine 100. In some examples, the support structure 302 resides at least partially within the trench 222 of the variable flowpath casing 202. In some examples, the support structure 302 implements support means. In some examples, the support structure 302 is defined by a sectored wishbone-type structure in which an example first wishbone structure 306 is moveably coupled to an example second wishbone structure 308 via the actuator bar 304. In some such examples, the first wishbone structure 306 implements first support means and the second wishbone structure 308 implements second support means. Further, the wishbone structures 306, 308 are coupled at an example radially outward (e.g., first) region 310 of the support structure 302 and an example radially inward (e.g., second) region 312 of the support structure 302. In some examples, the actuator bar 304 is coupled to the support structure 302 at a third region 313 between the radially outward region 310 and the radially inward region 312. In additional or alternative examples, the support structure 302 can be a single structure manufactured via an additive manufacturing process. In some such examples, the wishbone structures 306, 308 can be portions of a single, additively manufactured support structure 302. In some examples, at least one wishbone structure 306, 308 is coupled (e.g., movably) to the trench ceiling 227. The wishbone structures 306, 308 of FIG. 3 are axially constrained (e.g., by the forward end 224 and the aft end 226 of the trench 222). As such, an axial force applied to the wishbone structures 306, 308 causes the support structure 302 to move in a radial direction, adjusting a height of the support structure 302.

As noted above, materials can respond differently to changes in ambient temperature based on properties (e.g., mechanical properties, thermal properties, etc.) of the materials. Materials are typically associated with a coefficient of thermal expansion (CTE) that can be used to predict growth (e.g., expansion) of a material in response to a known temperature change. The CTE corresponds to a fractional growth of a material per degree change in temperature. A relatively high CTE indicates that a material will expand more per degree temperature increase. Different materials have different CTEs, which allows manufacturers to use materials that are well suited for a particular use. Ceramics, for example, have relatively low CTEs while polymers have high CTEs.

In some examples, the support structure 302 is manufactured using material associated with a relatively low CTE, such as titanium, iron, steel, etc. For example, titanium may have a CTE of approximately 8*10^(−6) m/(m° C.). In some such examples, the support structure 302 may expand and/or contract relatively slow in response to a change in temperature of ambient air surrounding the support structure 302. The actuator bar 304 is manufactured using a material associated with a relatively high CTE, such as aluminum, copper, etc. For example, aluminum may have a CTE of approximately 20*10^(−6) m/(m° C.). As such, the actuator bar 304 experiences a rate of thermal expansion that is faster than a rate of thermal expansion of the support structure 302. In some examples, the support structure 302 and the actuator bar 304 are associated with respective materials that include a CTE different of approximately 10*10^(−6) m/(m° C.). However, the difference can be larger or smaller in additional or alternative examples. In some examples, the difference may depend on an application of the turbine engine 100. In some examples, the actuator bar 304 thus implements a variable bar that is operatively coupled to the first wishbone structure 306 and the second wishbone structure 308. In some examples, the actuator bar 304 implements movement means.

In some examples, the support structure 302 includes an example gap 314 that enables ambient air to traverse the actuator bar 304. The support structure 302 and the actuator bar 304 are in fluid communication with ambient air, which can change in temperature during operation of the turbine engine 100. In some examples, the ambient air also surrounds the rotor blade(s) 212. In some examples, a temperature of ambient air surrounding the rotor blade(s) 212 is the same or similar to a temperature of ambient air that traverses the variable flowpath component 300. As the ambient air passes through the variable flowpath component 300, a temperature change in the ambient air can cause the actuator bar 304 and/or the support structure 302 to expand and/or contract (e.g., at different rates), depending on a temperature of the ambient air at a given moment. For example, ambient air that increases in temperature can cause the actuator bar 304 to increase in temperature, resulting in expansion of the actuator bar 304 (e.g. in length). Similarly, as the ambient air decreases in temperature, the actuator bar 304 consequently decreases in temperature and contracts.

Figure 4:
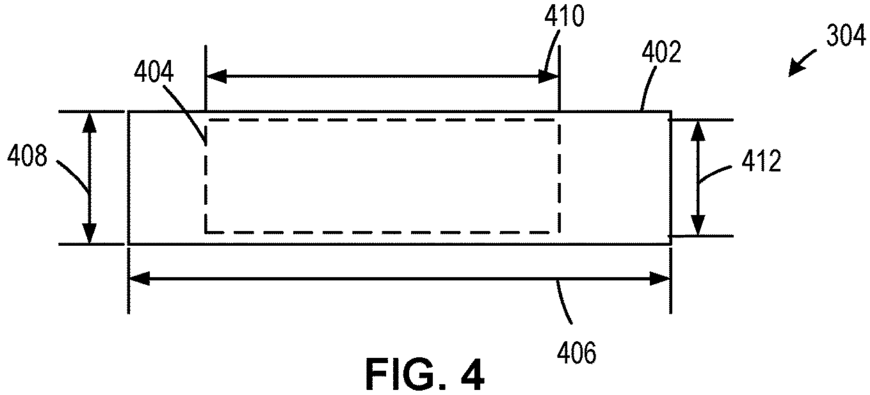
FIG. 4 is an illustration of an example actuator bar in an example expanded form and an example contracted form in accordance with the teachings of this disclosure.

FIG. 4 is an illustration of the example actuator bar 304 of FIG. 3 in an example first (e.g., expanded) form 402 associated with a first ambient air temperature and an example second (e.g., contracted) form 404 associated with a second ambient air temperature that is less than the first ambient air temperature. The actuator bar 304 in the expanded form 402 is defined by an example first length 406 (e.g., in the axial direction A) and an example first height 408 (e.g., in the radial direction R). As the ambient air temperature decreases (e.g., towards the second ambient air temperature), the actuator bar 304 reduces in temperature and contracts towards the contracted form 404. The actuator bar 304 in the contracted form 404 is associated with an example second length 410, which is less than the first length 406 associated with the expanded form 402. Further, contracted form 404 of the actuator bar 304 is defined by an example second height 412, which is less than the first height 408 associated with the expanded form 402. In some examples, a difference between the first length 406 and the second length 410 is larger than a difference between the first height 408 and the second height 412.

Figure 5:
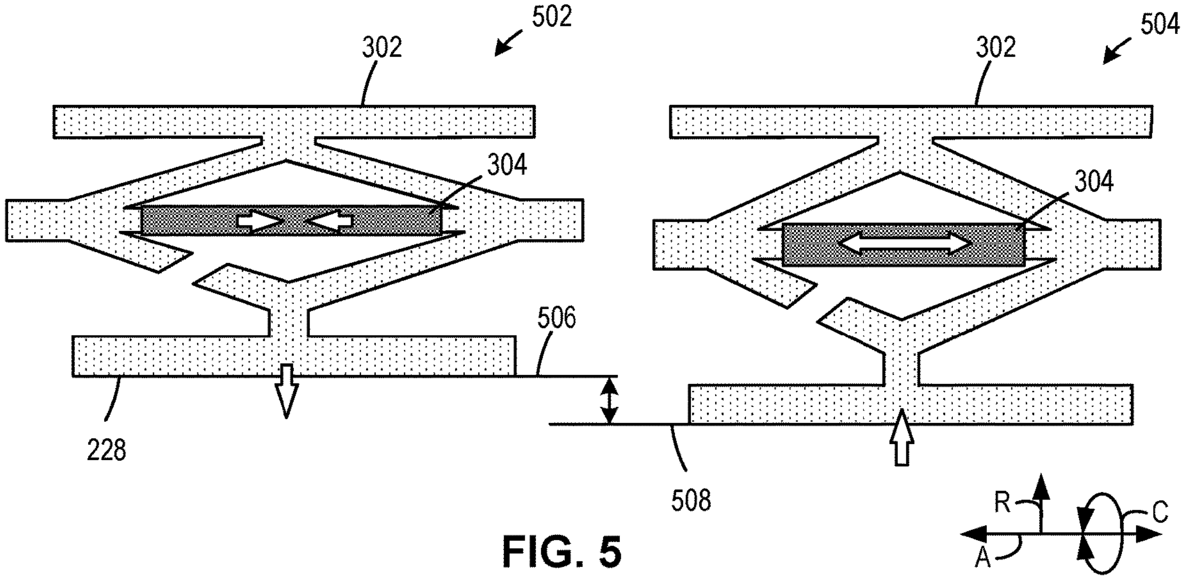
FIG. 5 illustrates the variable flowpath component of FIG. 3 in different positions in accordance with the teachings of this disclosure.

FIG. 5 illustrates the variable flowpath component 300 of FIG. 3 in different positions in accordance with the teachings of this disclosure. FIG. 5 illustrates the variable flowpath component 300 in an example first position 502 and an example second position 504. The first position 502 may be associated with a relatively high ambient air temperature (e.g., as compared ambient air temperature associated with the second position 504). When the turbine engine 100 is an engine for an airplane, the first position 502 can be an assembly position associated with a grounded airplane (e.g., turbine engine 100). Ambient temperatures near the surface of Earth are generally higher than ambient temperatures at a higher altitude. In some examples, the second position 504 can be associated with an operating position of the fan 200. In the first position 502, the variable surface 228 of the support structure 302 is at an example first radial distance 506 (e.g., measured to centerline axis 102). Further, the actuator bar 304 is in an expanded form (e.g., expanded form 402).

As ambient air surrounding the variable flowpath component 300 reduces in temperature, the actuator bar 304 contracts. As noted above, the actuator bar 304 is operatively coupled to the first wishbone structure 306 and the second wishbone structure 308 of the support structure 302. As the actuator bar 304 contracts, the actuator bar 304 reduces in length, pulling the wishbone structures 306, 308 towards each other. The force on the wishbone structures 306, 308 causes the variable surface 228 of the support structure 302 to move in a radially inward direction (e.g., towards a rotor blade tip 214) and towards an example second radial distance 508 associated with the second position 504 of the variable flowpath component 300. In other words, as ambient air temperature reduces, the actuator bar 304 cools and contracts, which pushes the variable surface 228 of the support structure radially inward to reduce tip clearance 218.

In the example of FIG. 5, the second position 504 of the variable flowpath component 300 may be associated with a relatively low ambient air temperature (e.g., as compared ambient air temperature associated with the first position 502). As such, the actuator bar 304 is in a contracted form (e.g., contracted form 404). In the second position 504, the variable surface 228 of the support structure 302 is at an example second radial distance 508 (e.g., measured to centerline axis 102). As the ambient air surrounding the variable flowpath component 300 increases in temperature, the actuator bar 304 expands. As the actuator bar 304 increases in length, the actuator bar 304 applies a pushing force on the wishbone structures 306, 308. Because the support structure 302 is axially constrained, the pushing force on the axially constrained wishbone structures 306, 308 causes the variable surface 228 of the support structure 302 to move in a radially outward direction (e.g., towards the outer substrate 204) towards the first radial distance 506. In other words, as ambient air temperature increases, the actuator bar 304 heats and expands, which pulls the variable surface 228 of the support structure radially outwards to reduce tip clearance 218.

Figure 6:
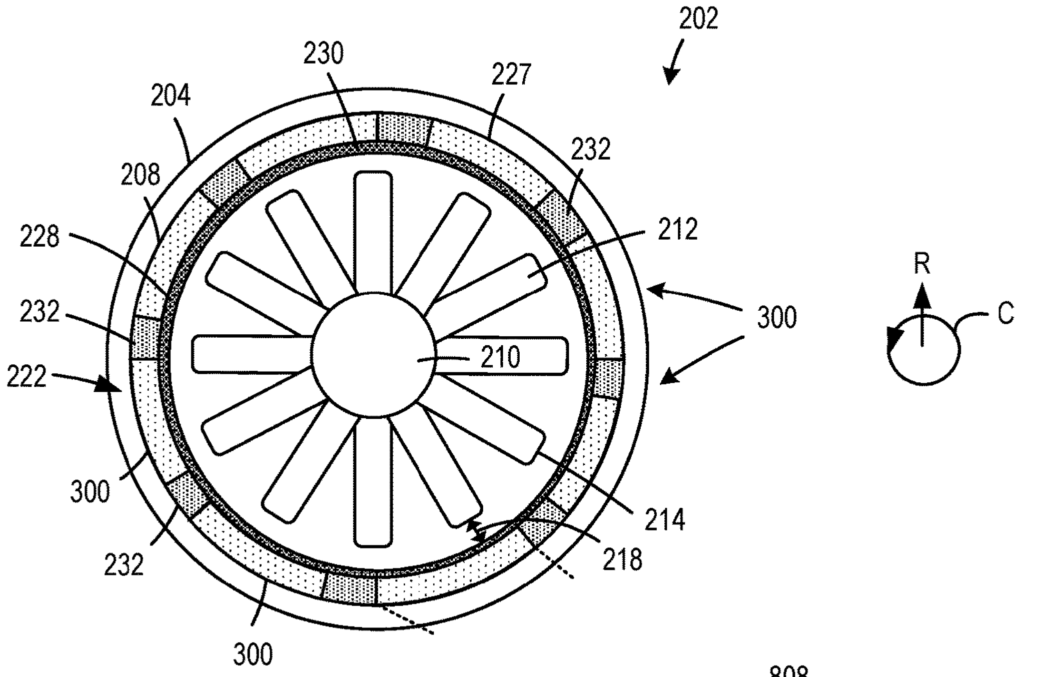
FIG. 6 is a schematic cross-sectional view of an example variable flowpath casing with the example variable flowpath component of FIG. 3 in accordance with the teachings of this disclosure.

FIG. 6 is a schematic circumferential cross-sectional view of the variable flowpath casing 202 with the example variable flowpath component(s) 300 of FIG. 3 in accordance with the teachings of this disclosure. The variable flowpath casing 202 of FIG. 6 surrounds and encloses the fan shaft 210 and the rotor blades 212 of the turbine engine 100. As illustrated in FIG. 6, the variable flowpath casing 202 includes a plurality of variable flowpath components 300, which are positioned circumferentially around an inner surface 208 of the outer substrate 204, within the trench 222. In the illustrated example of FIG. 6, example trench fillers 232 are positioned circumferentially about the trench 222. For example, a trench filler 232 can reside on either side of a variable flowpath component 300. Example variable surfaces 228 of the variable flowpath components 300, which include example abradable layers 230, are positioned radially outward from rotor blade tips 214 of the rotor blades 212. Tip clearance(s) 218 are illustrated between the rotor blade tips 214 and the abradable layer(s) 230.

The variable flowpath casing 202 and fan shaft 210 experience different loads during operation of the turbine engine 100 that affect tip clearance 218. However, the variable flowpath component(s) 300 is a smart structure that adjusts its height based on a temperature of ambient air to provide blade-tip-to-casing clearance control. Therefore, the variable flowpath components 300 that circumferentially surround the rotor blade tips 214 passively control tip clearance 218 to mitigate issues with tip clearance.

Figure 7:
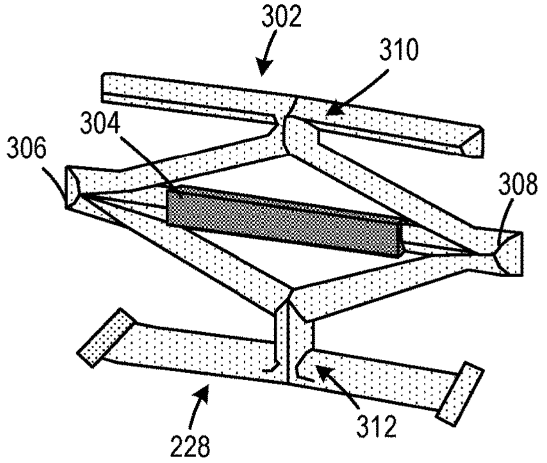
FIG. 7 is an illustration of a three-dimensional view of the example variable flowpath component of FIGS. 3-6.

FIG. 7 is an illustration of a three-dimensional view of the example variable flowpath component(s) 300 of FIGS. 3-6. The variable flowpath component 300 includes the support structure 302 (e.g., the first wishbone structure 306 and the second wishbone structure 308, which are coupled at the radially outward region 310 and the radially inward region 312 of the support structure), the variable surface 228, and the actuator bar 304.

Figure 8:
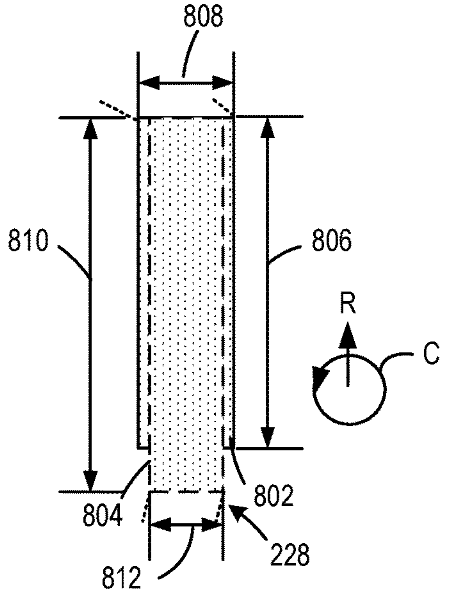
FIG. 8 is schematic illustration of an axial view of an example support structure in in different positions in accordance with the teachings of this disclosure.

FIG. 8 is schematic illustration of an axial view of an example support structure 302 of FIGS. 3-7 in different positions in accordance with the teachings of this disclosure. FIG. 8 illustrates the support structure 302 in an example first position 802 in which the variable surface 228 is radially outwards (e.g., to increase tip clearance 218) and an example second position 804 in which the variable surface 228 is radially inwards (e.g., to decrease tip clearance 218). In the first position 802, an example actuator bar 304 (not illustrated in FIG. 8) may be in a contracted form (e.g., contracted form 404) associated with a relatively low ambient air temperature. In the second position 804, the actuator bar 304 may be in an expanded form (e.g., expanded form 402) associated with a relatively high ambient air temperature.

The support structure 302 in the first position 802 is defined by an example first height 806 and an example first width 808. As the ambient air temperature increases, the actuator bar 304 increases in temperature and expands, causing the variable surface 228 to move radially inwards. The support structure 302 in the second position 804 is defined by an example second height 810 and an example second width 812. The first height 806 of the first position 802 is smaller than the second height 810 of the second position. As such, the variable surface 228 is radially closer to a rotor blade tip 214 in the second position 804. In some examples, a difference between the first width 808 and the second width 812 is much smaller than a difference between the first height 806 and the second height 810. In some examples, a difference between the first width 808 and the second width 812 is substantially zero.

Figure 9:
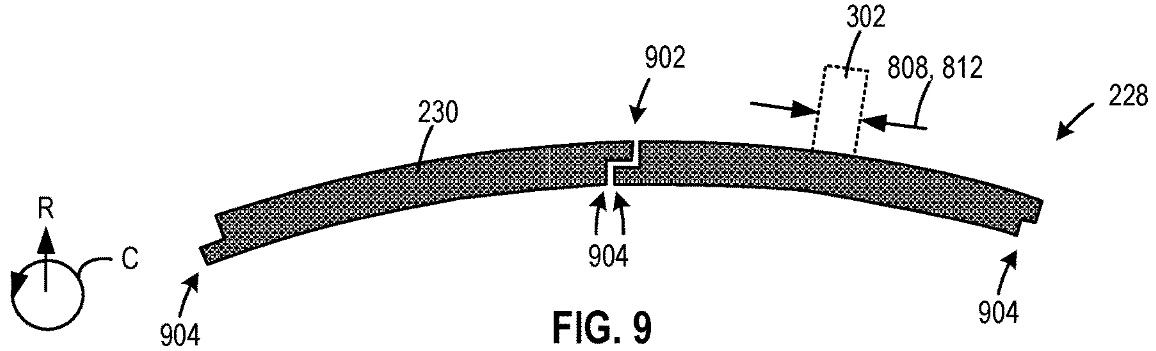
FIG. 9 is an illustration an example abradable layer that can be coupled to a variable surface in accordance with the teachings of this disclosure.

FIG. 9 is an illustration of an example abradable layer(s) 230 that can be coupled to a variable surface 228 of a variable flowpath component 300 in accordance with the teachings of this disclosure. As illustrated in FIG. 9, the abradable layer 230 is segmented to align with a respective variable flowpath component 300. The abradable material couples to the radial inward surface of the support structure 302, as illustrated in FIG. 9. The abradable layer(s) 230 circumferentially surround the example rotor blade(s) as illustrated in FIG. 6. In some examples, the abradable layer(s) 230 include an axial length that corresponds to an axial length of a trench (e.g., from a forward end 224 of the trench 222 of FIG. 2 towards an aft end 226 of the trench 222 of FIG. 2). However, the axial length of the abradable layer(s) 230 can be longer or shorter in some examples. As illustrated in FIG. 9, a width 808, 812 of the support structure 302 can be coupled to a circumferential region of the abradable layer 230. Thus, a length of an abradable layer(s) 230 at the circumferential region can be in surface contact with an axial length of the support structure 302.

In the illustrated example, the abradable layer(s) 230 includes an example rabbet(s) 902 at example circumferential ends 904 of the abradable layer 230. As disclosed herein, a rabbet is a recess (e.g., groove, etc.) at an edge (e.g., end) of a piece of material (e.g., often used for shiplap). In some examples, the rabbet(s) 902 is applied to the abradable layer 230 via a subtractive manufacturing process (e.g., by machining the rabbet 902). In additional or alternative examples, the abradable layer 230 is additively manufactured to include the rabbet(s) 902.

Figure 10:
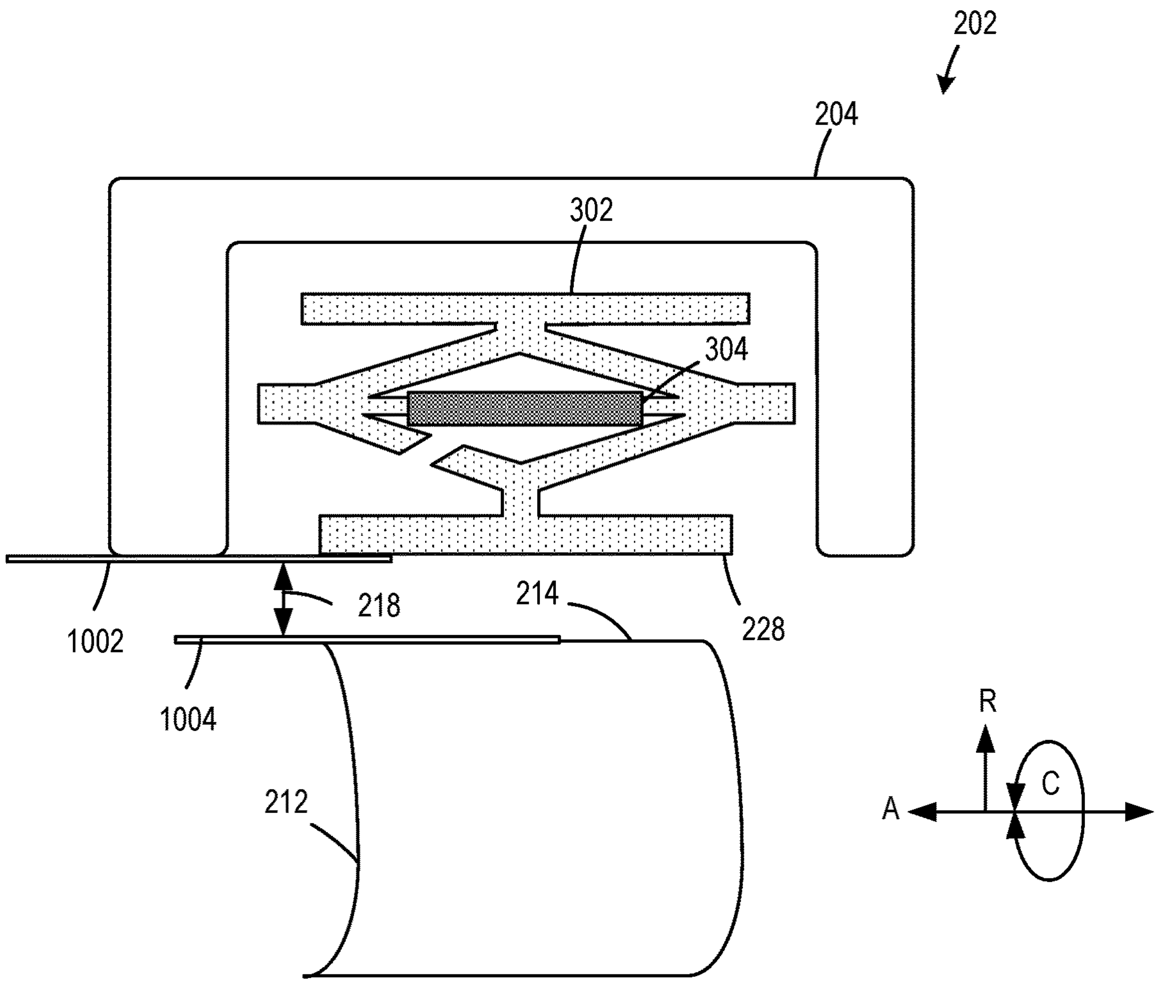
FIG. 10 is another illustration of the example variable flowpath casing and variable flowpath component of FIG. 3.

FIG. 10 is another illustration of the example variable flowpath casing 202 and variable flowpath component 300 of FIGS. 3-9. FIG. 10 illustrates an example radial distance 1002 of the variable surface 228 of the support structure 302 measured from centerline axis 102 (not illustrated in FIG. 10). FIG. 10 also illustrates an example radial distance 1004 of the rotor blade tip 214 from centerline axis 102.

Even though the variable flowpath casing 202 and the rotor blades 212 are exposed to substantially the same ambient temperature, components of each may be associated with different response times to changes in ambient temperature due to differential thermal expansion rates. For example, a material of a rotor blade 212 may expand in response to a change in ambient temperature at a greater rate than a material of the support structure 302 and/or the actuator bar 304. Matching response times of the variable flowpath component 300 with response times of the rotor blades 212 can be important for maintaining tight tip clearance 218 at the rotor blade tips 214.

Figure 11:
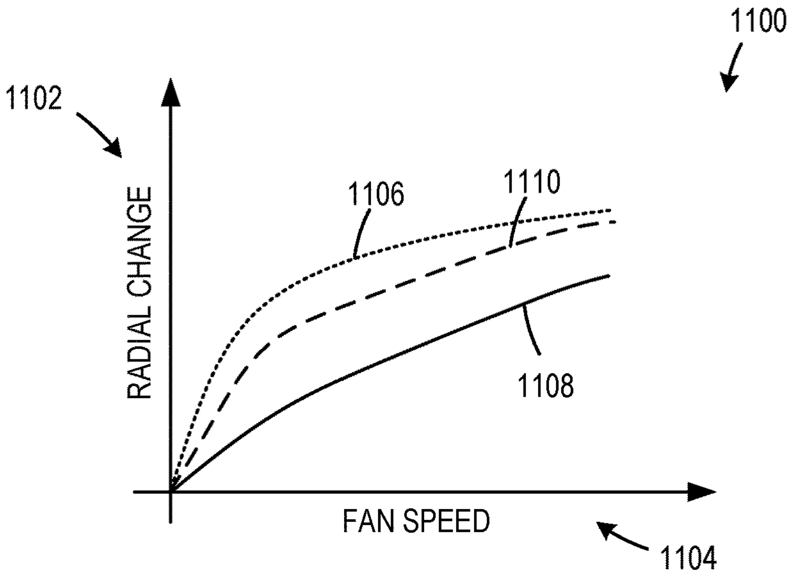
FIG. 11 depicts an example graph illustrating a relationship between radial change of a component of the turbine engine and fan speed.

FIG. 11 depicts an example graph 1100 illustrating a relationship between radial change 1102 of a component of the turbine engine 100 and fan speed 1104. Radial change 1102 refers to a change in radial distance 1002, 1004 of a component measured from the centerline axis 102 during a given moment of time. Fan speed 1104 refers to a speed at which the rotor blade(s) 212 rotate circumferentially about the fan shaft 210.

An example first curve 1106 illustrates a radial change 1102 in a radial distance 1004 of a rotor blade tip 214 from the centerline axis 102 as fan speed 1104 changes. As the rotor blades 212 increase in speed, the radial distance 1004 of the rotor blade tip 214 increases. As illustrated in FIG. 11, the radial change 1102 of the radial distance 1004 of the rotor blade tip 214 initially increases quickly with fan speed 1104, but slows down as fan speed 1104 continues to increase.

An example second curve 1108 illustrates example radial change 1102 in a variable surface 228 of a variable flowpath component 300 without modification as fan speed 1104 changes. As illustrated in FIG. 11, radial change 1102 of the radial distance 1002 of the variable surface 228 increases linearly with fan speed 1104. The rotor blade 212 experiences logarithmic growth while the variable flowpath component 300 experience linear growth. However, the variable flowpath component 300 can be configured in a variety of manners to control a thermal time constant such that the variable flowpath component 300 and the rotor blade(s) 212 undergo similar rates of expansion and/or contraction to maintain a desired tip clearance 218.

An example third curve 1110 illustrates example radial change 1102 in a variable surface 228 of a variable flowpath component 300 with modifications (e.g., discussed below in relation to FIGS. 12A-12D) as fan speed 1104 changes. That is, the variable flowpath component 300 can be structured such that radial change 1102 of the variable surface 228 can align with radial change 1102 of the rotor blade tip 214.

FIGS. 12A-12D illustrate example configurations of an example variable flowpath component 300 to achieve a desired thermal constant in accordance with the teachings of this disclosure. That is, FIGS. 12A-12D illustrate variations of the support structure 302 and/or the actuator bar 304 to control the response time of the variable flowpath component 300 to the ambient temperature. For example, the constant can be controlled by using different actuator bar 304 cross sections, manufacturing the support structure 302 with fins, with one or more holes, and/or with a different thickness and/or angle. Such variations can be used to control a heat convection rate.

Figure 12A:
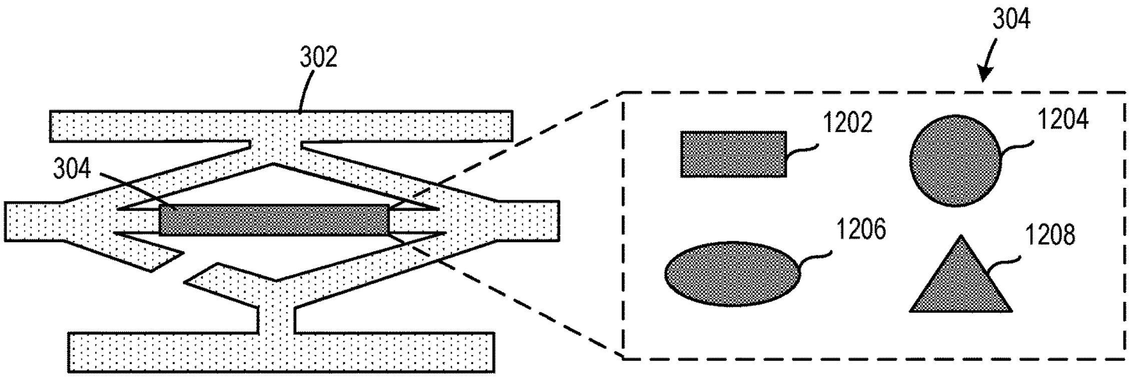
FIG. 12A depicts another implementation of the example variable flowpath component of FIGS. 3-11 in accordance with the teachings of this disclosure.

FIG. 12A illustrates an example variable flowpath component 300, including an example actuator bar 304 and example cross sections of the actuator bar 304. In some examples, the actuator bar 304 includes an example rectangular cross section 1202. In some examples, the actuator bar 304 includes an example circular cross section 1204. In some examples, the actuator bar 304 includes an example ovular cross section 1206. In some examples, the actuator bar 304 includes an example triangular cross section 1208. The actuator bar 304 can include additional or alternative cross sections not disclosed herein. In some examples, the different cross sections 1202, 1204, 1206, 1208 can be associated with different heat convention rate. Thus, selecting a cross section of the actuator bar 304 allows control of a thermal time constant of the variable flowpath component 300.

Figure 12B:
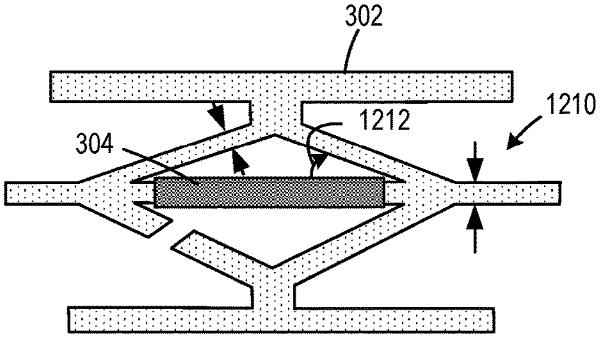
FIG. 12B depicts another implementation of the example variable flowpath component of FIGS. 3-11 in accordance with the teachings of this disclosure.

FIG. 12B illustrates another example variable flowpath component 300, which includes a different thickness 1210 of the support structure 302 than other examples disclosed herein. Further, the wishbone structures 306, 308 include different angles 1212. These can be applied to the variable flowpath component 300 to maintain a similar reaction time with the rotor blade(s) 212.

Figure 12C:
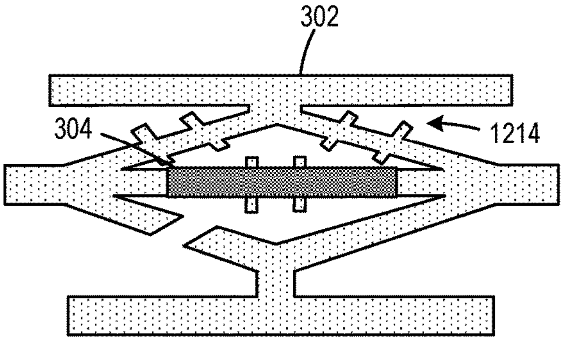
FIG. 12C depicts another implementation of the example variable flowpath component of FIGS. 3-11 in accordance with the teachings of this disclosure.

FIG. 12C illustrates another example variable flowpath component 300, which includes example fins 1214. The fins 1214 are surfaces that extend from the support structure 302 and/or the actuator bar 304 to increase the rate of heat transfer to and/or from the ambient air by increasing convection. The fins 1214 increase the heat transfer rate by increasing the area of heat transfer. Thus, by designing and applying fins 1214 to the support structure 302 and/or to the actuator bar 304, a thermal time constant for the variable flowpath component 300 can be controlled. The support structure 302 can include any number of fins 1214, which can take on any suitable shape and/or size to control a heat convection rate to match the response time of the rotor blade(s) 212.

Figure 12D:
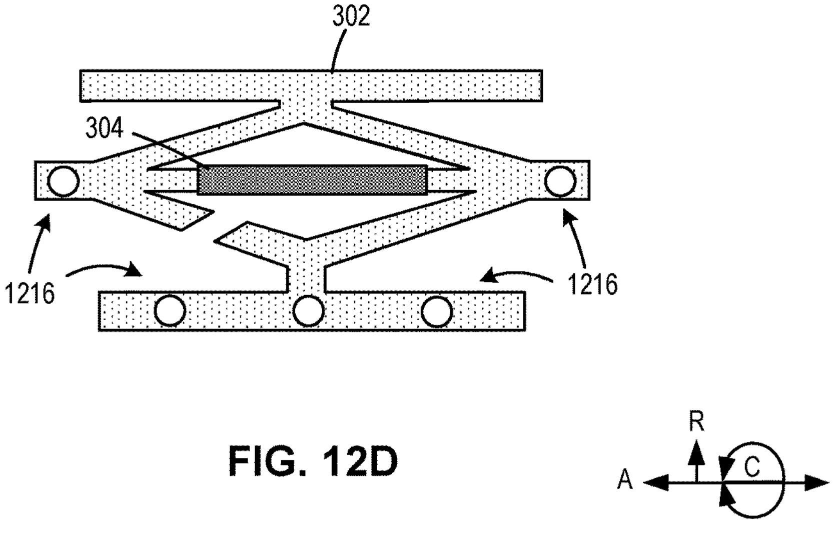
FIG. 12D depicts another implementation of the example variable flowpath component of FIGS. 3-11 in accordance with the teachings of this disclosure.

FIG. 12D illustrates another example variable flowpath component 300, which includes examples holes 1216 in the support structure 302. The example holes 1216 can be used to adjust a surface area and/or volume of the support structure 302 to help manage convention rates. Whereas the fins 1214 increase the heat transfer rate by increasing the area of heat transfer, the holes 1216 decrease the heat transfer rate by decreasing the area of heat transfer. While the holes 1216 are circular in the illustrated example, the holes 1216 can take on different shapes and/or sizes in additional or alternative examples. Further, the support structure 302 can include any number of holes (e.g., to control a heat convection rate to match the response time of the rotor blade(s) 212).

Figure 13:
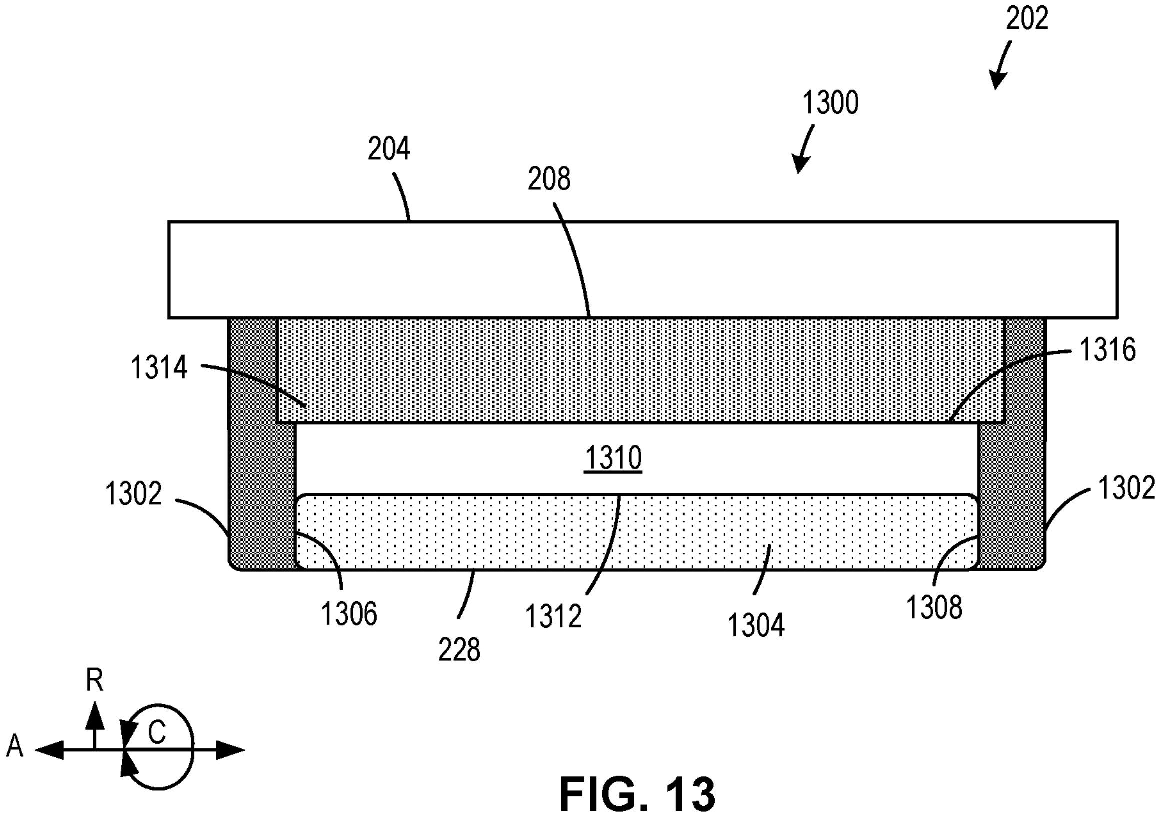
FIG. 13 is a schematic illustration of an example variable flowpath component for a variable flowpath casing constructed in accordance with the teachings of this disclosure.

FIG. 13 is a schematic illustration of an example variable flowpath component 1300 for a variable flowpath casing 202 constructed in accordance with the teachings of this disclosure. The variable flowpath component(s) 1300 of FIG. 13 implements an example PCC mechanical actuation system for blade-tip-to-casing clearance control that actuates based on a temperature of ambient air surrounding the variable flowpath component 1300. In some examples, the variable flowpath component 1300 implements actuation means. The example variable flowpath component of FIG. 13 includes an example actuator structure(s) 1302 and an example shroud segment 1304. The example actuator structure(s) 1302 is manufactured using a material associated with a negative coefficient of thermal expansion (NCTE), such as an ALLVAR® alloy. Whereas most materials expand when heated and contract when cooled, materials associated with a NCTE expand when cooled and contract when heated. As such, the actuator structure 1302 of FIG. 13 expands as its temperature decreases and contracts as its temperature increases. In some examples, the actuator structure 1302 implements movement means.

The shroud segment 1304 implements an example variable surface 228. In some examples, the shroud segment 1304 can include an abradable layer 230 at the variable surface 228. The shroud segment 1304 is coupled to a forward actuator structure 1302 at a forward end 1306 of the shroud segment 1304 and to an aft actuator structure 1302 at an aft end 1308 of the shroud segment 1304. The example shroud segment 1304 is manufactured using a material having a positive, and relatively low, CTE. In some examples, the shroud segment 1304 implements variable surface means.

The variable flowpath component 1300 of FIG. 13 includes an example gap 1310 that enables the actuator structure 1302 and/or the shroud segment 1304 to move in the radial direction (e.g., radially inward and radially outward). In some such examples, the gap 1310 extends between a radially outward surface 1312 of the shroud segment 1304 and the inner surface 208 of the outer substrate 204. In some examples, an example honeycomb layer 1314 extends circumferentially around the inner surface 208 of the outer substrate 204. In some such examples, the gap 1310 extends from the radially outward surface 1312 of the shroud segment 1304 to an example radially inward surface 1316 of the honeycomb layer 1314. The example honeycomb layer 1314 can provide energy absorption capabilities by dampening vibrations. For example, the honeycomb layer 1314 can reduce vibrations that transfer to the variable flowpath casing 202 from pressures of the rotor blades 212. In some examples, the honeycomb layer 1314 absorbs impactors from the rotor blades 212 before impactors (e.g., blade-out events) are transmitted to directly onto the outer substrate 204. The variable flowpath component 1300 of FIG. 1300 thus serves a dual purpose by acting as a compliant structure to absorb more energy and withstand higher impact load during a blade-out event.

In some examples, the ambient air increases in temperature during operation of the turbine engine 100. In such examples, the ambient air affects an increase in temperature in the rotor blades 212, causing the rotor blades 212 to expand and the rotor blade tips 214 to move radially outward towards the variable surface 228 of the variable flowpath component 1300. Further, the ambient air affects an increase in temperature of the actuator structures 1302. However, because the actuator structures 1302 are associated with a NCTE, the actuator structures 1302 contract in response to the temperature increase. As such, actuator structure 1302 causes the variable surface 228 to move radial outwards as the rotor blade tips 214 move radially outward to maintain tip clearance 218.

The variable flowpath component 1300 and the rotor blades 212 are in fluid communication with ambient air, which can change in temperature during operation of the turbine engine 100. As the ambient air passes through the variable flowpath component 1300, a temperature change in the ambient air can cause the actuator structure 1302 and/or the shroud segment 1304 to expand and/or contract (e.g., at different rates), depending on a temperature of the ambient air at a given moment. For example, a relatively high ambient air temperature can increase a temperature of the actuator structure 1302. Similarly, the ambient air can cause the rotor blades 212 to change temperature, causing the rotor blades to expand (e.g., based on a temperature increase) or contract (e.g., based on a temperature decrease).

In some examples, the ambient air decreases in temperature during operation of the turbine engine 100. In such examples, the ambient air affects a decrease in temperature in the rotor blades 212, causing the rotor blades 212 to contract and the rotor blade tips 214 to move radially inwards to open the tip clearance 218. However, the actuator structures 1302 expand in response to the temperature decrease because they are associated with the NCTE. As such, actuator structure 1302 causes the variable surface 228 to move radial inwards as the rotor blade tips 214 move radially inwards to compensate rotor blade 212 contraction and maintain a tight tip clearance 218.

Figure 14:
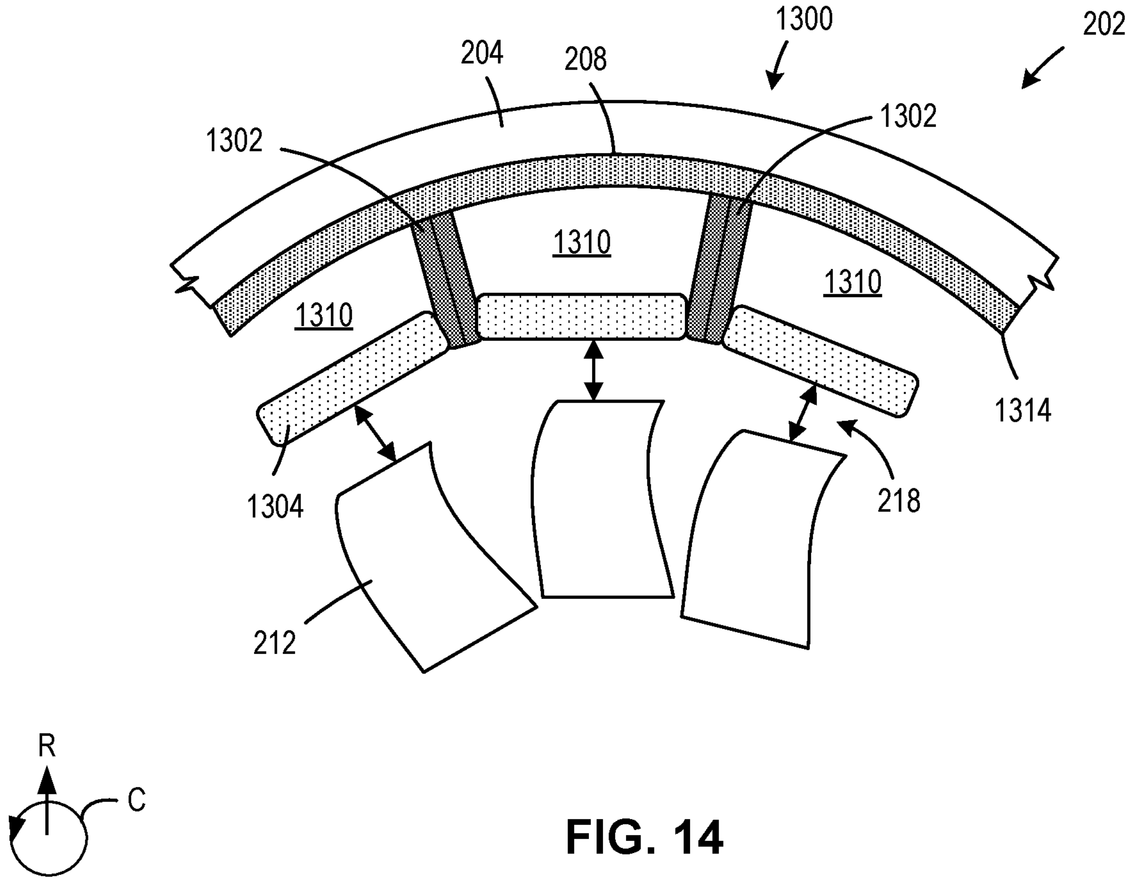
FIG. 14 is a partial circumferential view of an example variable flowpath casing with the variable flowpath component of FIG. 19.

FIG. 14 is a partial circumferential view of an example variable flowpath casing 202 with the example variable flowpath component(s) 1300 of FIG. 13. FIG. 14 illustrates that the variable flowpath casing 202 includes a plurality of variable flowpath component(s) 1300 that are circumferentially discontinuous, enabling radial expansion at relatively low ambient air temperatures. In some examples, the variable flowpath casing 202 includes a same number of variable flowpath components 1300 as a number of rotor blades 212. However, the variable flowpath casing 202 can include more or less variable flowpath components 1300 in additional or alternative examples. As illustrated in FIG. 14, the example honeycomb layer 1314 extends circumferentially about the inner surface 208 of the outer substrate 204.

In some examples, the turbine engine 100 is an engine of an airplane. In such examples, the variable flowpath component(s) 1300 maintain open tip clearance 218 during an example pinch-point (e.g., sea-level altitude takeoff) and maintain tighter tip clearance 218 at cruise altitude. As ambient air temperature increases during takeoff, the rotor blades 212 expands, forcing the rotor blade tips 214 to move radially outward towards the shroud segments 1304. However, because the actuator structures 1302 have a NCTE, the increased temperature causes the actuator structures 1302 to contract and maintain open tip clearance 218 (e.g., avoiding blade tip rubbing). As ambient air temperature decreases during cruise at a relative high altitude, the rotor blades 212 contract, forcing the rotor blade tips 214 radially inward. The decreased temperature causes the actuator structures 1302 to expand, forcing the shroud segments 1304 radially inward to prevent open tip clearance 218.

Figure 15:
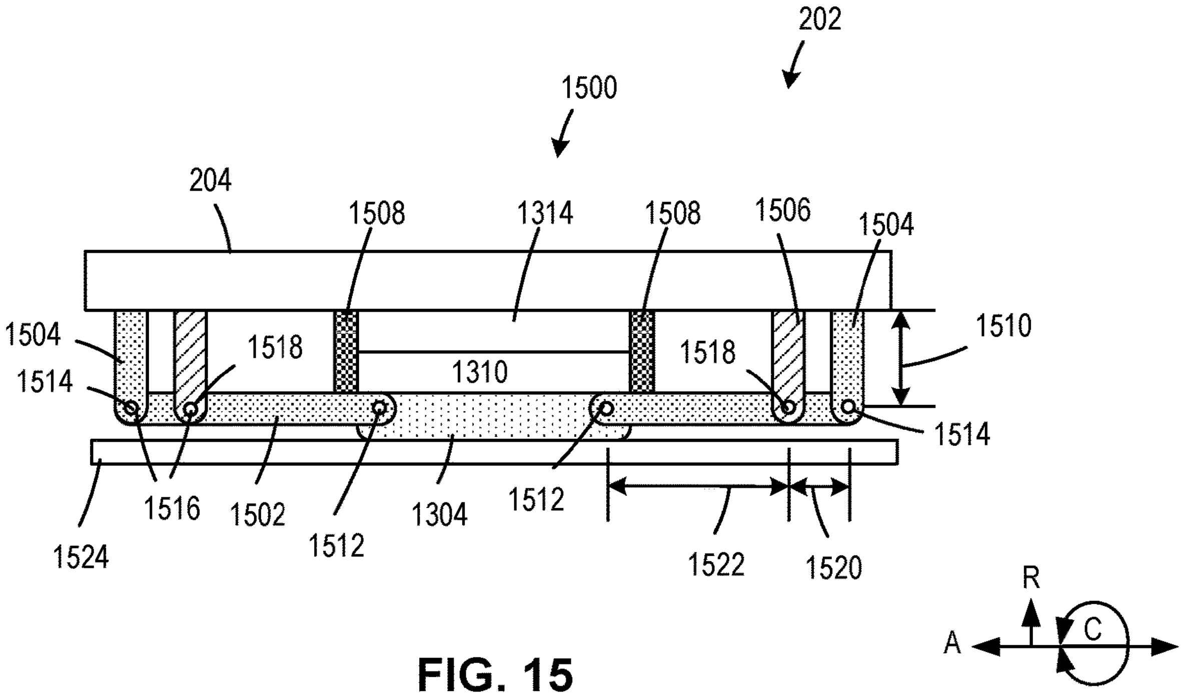
FIG. 15 is a schematic illustration of an example variable flowpath component for a variable flowpath casing constructed in accordance with the teachings of this disclosure.

FIG. 15 is a schematic illustration of an example variable flowpath component(s) 1500 for a variable flowpath casing 202 constructed in accordance with the teachings of this disclosure. The variable flowpath component(s) 1500 of FIG. 15 implements an example PCC mechanical actuation system for blade-tip-to-casing clearance control that actuates based on a temperature of ambient air surrounding the variable flowpath component 1500. In some examples, the variable flowpath component 1500 implements actuation means. The variable flowpath component(s) 1500 are similar to the variable flowpath component(s) 1300 of FIG. 13. As such, the variable flowpath component 1500 includes an example shroud segment 1304 and an example gap 1310 that enable radial movement of the shroud segment 1304. However, the variable flowpath component(s) 1500 include linkages that amplify motion(s) of the shroud segments 1304 to provide increased blade-tip-to-casing clearance control. In some examples, the honeycomb layer 1314 extends circumferentially around the inner surface 208 of the outer substrate 204.

The variable flowpath component 1500 of FIG. 15 includes an example hinge set, which includes an example lever arm(s) 1502, an example outer radial linkage(s) 1504, and an example inner radial linkage(s) 1506, and an example guide structure(s) 1508. The variable flowpath component 1500 includes at least one hinge set coupled to each circumferential side of the shroud segment 1304 to move the shroud segment 1304 in radially to maintain a desired tip clearance 218. In some examples, the variable flowpath component 1500 includes a hinge set at each corner of the shroud segment 1304. In some examples, the hinge set (lever arm(s) 1502, outer radial linkage(s) 1504, and/or inner radial linkage(s) 1506) implements movement means. In some such examples, the lever arm(s) 1502 implements lever means, the outer radial linkage(s) 1504 implements first movement means, and the inner radial linkage(s) 1506 implement second movement means.

In the example of FIG. 15, the guide structures 1508 are coupled to the inner surface 208 of the outer substrate 204 and extend radially inward. In some examples, the guide structures 1508 implement a support structure for the shroud segment 1304. In some examples, the guide structures 1508 implement a guide structure the shroud segment 1304. As noted above, the shroud segment 1304 is structured to move in a radial direction to adjust a tip clearance 218. Thus, the guide structures 1508 can provide a guide for the shroud segment 1304 during operation.

The example radial linkages 1504, 1506 are coupled to the inner surface 208 of the outer substrate 204 and extend radially inward from the outer substrate 204 to an initial distance defined by an example first length, L, 1510 of the radial linkages 1504, 1506. The example lever arm(s) 1502 is coupled to the shroud segment 1304 at an example first connection point(s) 1512 and to an outer radial linkage 1504 at an example second connection point(s) 1514 using revolute (e.g., pin, hinge, etc.) joints 1516. The lever arm(s) 1502 is coupled to an inner radial linkage 1506 at an example third connection point(s) 1518 between the first connection point 1512 and the second connection point 1514 using a revolute joint 1516.

In the example of FIG. 15, the lever arms 1502 and the outer radial linkage 1504 are manufactured using (e.g., including) a material associated with a relatively high positive CTE (e.g., as compared to a CTE of the shroud segment 1304). As such, the lever arms 1502 and the outer radial linkages 1504 expand upon an increase in temperature and contract upon a decrease in temperature. In the example of FIG. 15, the inner radial linkages 1506 is manufactured using a material associated with a NCTE. As such, the inner radial linkages 1506 expand upon a decrease in temperature and contract upon an increase in temperature.

In some examples, the ambient air increases in temperature during operation of the turbine engine 100, causing the rotor blades 212, the lever arms 1502, and the radial linkages 1504, 1506 to increase in temperature. The rotor blades 212 expand as they increase in temperature, causing the rotor blade tips 214 to move radially outward towards the variable surface 228 of the variable flowpath component 1500. The lever arms 1502 and the outer radial linkages 1504 are associated with a relatively high CTE and, thus, expand with the increased temperature. The inner radial linkages 1506, however, are associated with a NCTE and thus contract in response to the temperature increase. Because the outer radial linkages 1504 expand while the inner radial linkages 1506 contract, the lever arm 1502 rotates in a first direction. The rotation of the lever arm 1502 causes the shroud segment 1304 to move radially outward and, thus, maintain a tip clearance 218.

In some examples, the ambient air decreases in temperature during operation of the turbine engine 100, causing the rotor blades 212, the lever arms 1502, and the radial linkages 1504, 1506 to decrease in temperature. The rotor blades 212 contract as they decrease in temperature, causing the rotor blade tips 214 to move radially inward (e.g., opening the tip clearance 218). The lever arms 1502 and the outer radial linkages 1504 contract with the decreased temperature while the inner radial linkages 1506 expand. Because the outer radial linkages 1504 contract while the inner radial linkages 1506 expand, the lever arm 1502 rotates in a second direction that is different than the first direction of rotation during an increase in temperature. The rotation of the lever arm 1502 causes the shroud segment 1304 to move radially inward to compensate rotor blade 212 contraction and maintain a tight tip clearance 218.

An example first distance 1520 is illustrated between the first connection point 1512 and the third connection point 1518. Further, an example second distance 1522 is illustrated between the third connection point 1518 and the second connection point 1514. An example lever arm ration can be determined by dividing the second distance 1522 by the first distance 1520. In some examples, the lever arm should be greater than 1 to enable proper amplification of motion of the shroud segment 1304. In other words, the first distance 1520 should be smaller than the second distance 1522 for proper amplification of motion of the shroud segment 1304. In some examples, the lever arm ratio is 10 (e.g., a second distance 1522 is ten times larger than a first distance 1520). However, the lever arm ratio can be larger or smaller in additional or alternative examples.

As an example, the variable flowpath component 1500 may be an engine of an airplane during takeoff. In this example, the variable flowpath component 1500 can include radial linkages 1504, 1506 that include a first length, L, 1510 of 1 inch. In this example, the inner radial linkages 1506 are made of an ALLVAR® alloy having an example NCTE (α) of 18e-06 in/in/F. In this example, the lever arms 1502 and outer radial linkages 1504 are made of a material having a relatively high positive CTE (α) of 18e-06 in/in/F. An example lever arm ratio is 10 (e.g., second distance 1522 is ten times the first distance 1520). A change in temperature (ΔT) from take-off to cruise is 100 degrees Fahrenheit. In such an example, the lever arms 1502 and the outer radial linkages 1504 experience a change in length (ΔL) defined by equation 1, below.

$$\Delta L=\alpha * L ** \Delta T \quad \text{(Equation 1).}$$

Thus, in such examples, the change in length, ΔL, is 0.0018 inch. An example effective clearance control can be determined by multiplying the change in length, ΔL, by two (e.g., for each lever arm 1502) and the lever arm ratio (e.g., 10). Thus, the variable flowpath component 1500 of this example can affect a 0.036 inch tip clearance 218 between a rotor blade tip 214 and a shroud segment 1304.

In the illustrated example of FIG. 15, the variable flowpath casing 202 includes an example cover 1524 to generate a substantially smooth flowpath. For example, the cover 1524 can piece one or more pieces of a material, such as sheet metal. However, the cover 1524 can be additional or alternative materials in some examples. In some examples, the cover 1524 prevents air flowing through the turbine engine 100 from flowing to the variable flowpath casing 202. In some examples, the cover 1524 can include an abradable layer 230. The cover 1524 circumferentially surrounds the rotor blades 212. In some examples, the cover 1524 can be a plurality of covers 1524 that are circumferentially connected.

Figure 16:
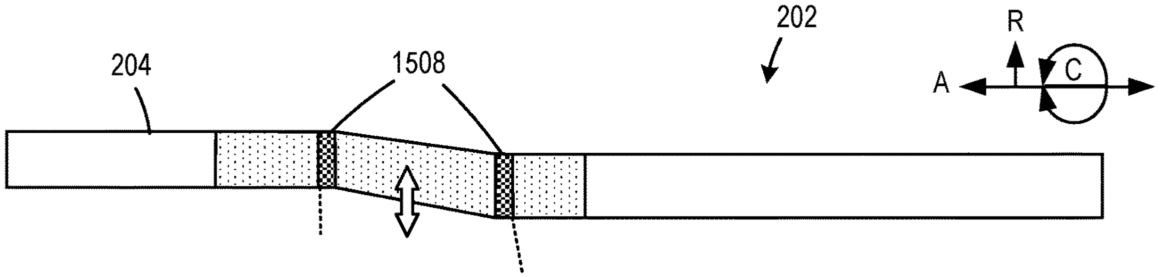
FIG. 16 is an axial view of an example of the example variable flowpath casing with the example variable flowpath component(s) of FIG. 15.

FIG. 16 is an axial view of an example of the example variable flowpath casing 202 with the example variable flowpath component(s) 1500 of FIG. 15. As illustrated in FIG. 16, the guide structure(s) 1508 implement a circumferential guide (e.g., 360 degree) to maintain circularity of the variable flowpath component 1500. In some examples, the variable flowpath component(s) 1500 that is part of a turbine engine 100 of an airplane can maintain open tip clearance 218 during an example pinch-point (e.g. sea-level altitude takeoff) and tighter tip clearance 218 at cruise altitude.

Figure 17:
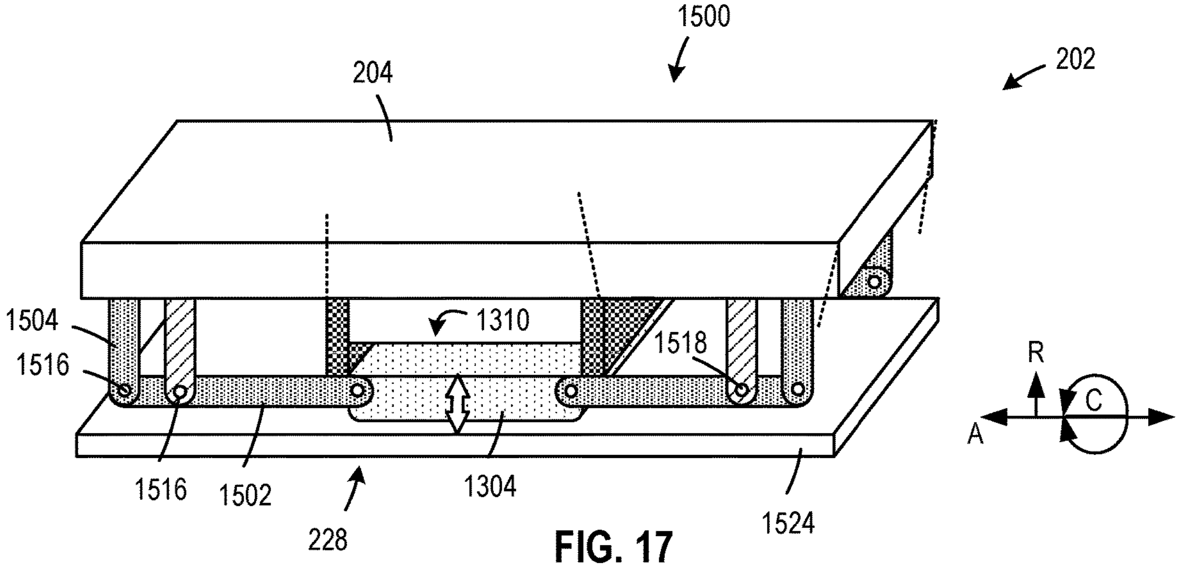
FIG. 17 is a partial three-dimensional view of the example variable flowpath component of FIGS. 15 and 16.

FIG. 17 is a partial three-dimensional view of the example variable flowpath component 1500 of FIGS. 15 and 16. As illustrated in FIG. 17, the variable flowpath component(s) 1600 include example lever arms 1502 that are coupled to the example shroud segment(s) 1304, extending axially upstream and/or axially downstream. The lever arms(s) 1502 are coupled to the example outer radial linkages 1504, which are associated with a NCTE, and to inner radial linkages 1506, which are associated with a relatively high positive CTE. Thus, an increase in ambient temperature causes the variable surface 228 to move radially inwards. Similarly, a decrease in ambient temperature causes the variable surface 228 to move radially outwards.

Figure 18:
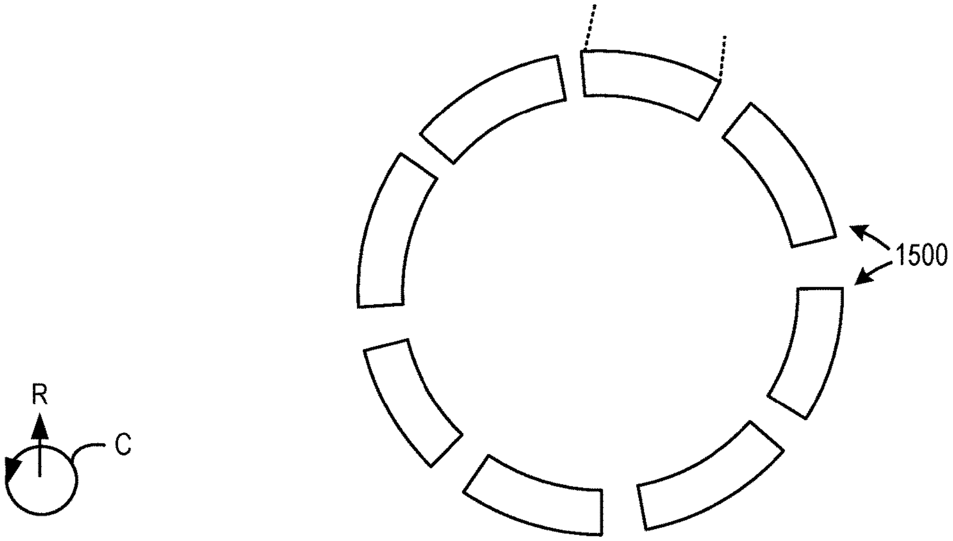
FIG. 18 is a schematic circumferential view of the variable flowpath component of FIGS. 15-17.

FIG. 18 schematically depicts a circumferential view of the variable flowpath component 1500 of FIGS. 15-17. As illustrated in FIG. 18, the variable flowpath casing 202 includes a plurality of variable flowpath component(s) 1500 that circumferentially surround the rotor blades 212. The linkages (e.g., lever arms 1502, outer radial linkages 1504, inner radial linkages 1506, etc.) are sectored, enabling radial expansion and contraction of the shroud segments 1304. In some examples, the variable flowpath casing 202 includes a same number of variable flowpath components 1500 as a number of rotor blades 212. However, the variable flowpath casing 202 can include more or less variable flowpath components 1500 in additional or alternative examples.

Figure 19:
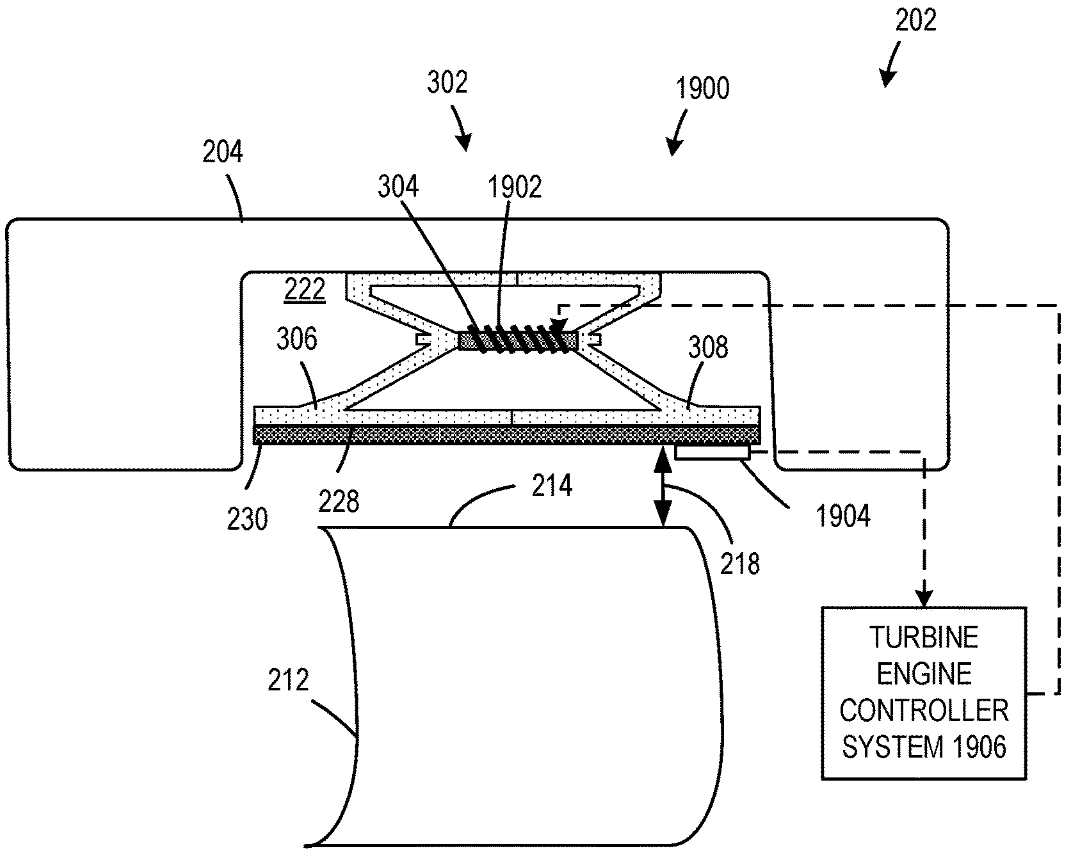
FIG. 19 is a schematic illustration of an example variable flowpath component for a variable flowpath casing constructed in accordance with the teachings of this disclosure.

FIG. 19 is a block diagram of another example variable flowpath component 1900 for a variable flowpath casing 202 constructed in accordance with the teachings of this disclosure. The variable flowpath component 1900 of FIG. 19 is similar to the variable flowpath component 300 of FIGS. 3-12. As such, the variable flowpath component 1900 includes an example support structure 302, an example actuator bar 304, and example wishbone structures 306, 308. However, the variable flowpath component 1900 of FIG. 19 implements an example active clearance control (ACC) system. As such, the variable flowpath component 1900 includes an example induction coil 1902, an example proximity sensor 1904, and an example turbine engine controller system 1906. In some examples, the variable flowpath component 1900 implements actuation means.

As noted above, the example actuator bar 304 operatively couples an example first wishbone structure 306 and an example second wishbone structure 308 of the support structure 302. The example support structure 302 of FIG. 19 is positioned at least partially within a trench 222 of the outer substrate 204 and is thus constrained in an axial direction. The example support structure 302 is made of a material associated with a relatively low CTE and, thus, may expand and/or contract relatively slow in response to a change in temperature of ambient air surrounds the support structure 302. The actuator bar 304, on the other hand, is manufactured using a material associated with a relatively high CTE. As such, the actuator bar 304 expands at a faster rate than the support structure 302.

During operation of the turbine engine 100, the support structure 302 and the actuator bar 304 are in fluid communication with ambient air, which can change in temperature during operation. The change in ambient air temperature can result in expansion and/or contraction of components of the turbine engine, leading to changes in tip clearance 218. In some examples, the change in ambient air temperature causes the actuator bar 304 to expand and/or contract, causing a force on the wishbone structures 306, 308. Because the wishbone structures 306, 308 are axially constrained, such a force causes the variable surface 228 of the support structure 302 to move in a radial direction to adjust tip clearance 218. That is, the example support structure 302 is structured to move in a radial direction to maintain tip clearance 218 in operation.

The variable flowpath component 1900 includes the induction coil 1902, which surrounds the actuator bar 304. In some examples, the induction coil 1902 implements external heat means. The induction coil 1902 of FIG. 19 is structured to transfer heat to the actuator bar 304. For example, an external source can cause an alternating current (AC) to flow through the induction coil 1902, which is an electric transformer used to produce high-voltage pulses. The induction coil 1902 transfers energy from the external power supply to the actuator bar 304 by generating an alternating electromagnetic field (EMF) (e.g., due to the AC flowing the induction coil 1902). The alternating EMF of the induction coil 1902 generates an induced current in the actuator bar 304, which heats the actuator bar 304. In response to the increased temperature, the actuator bar 304 expands in length, causing the variable surface 228 of the support structure 302 to move radially inward to maintain a tight tip clearance 218.

The variable flowpath component 1900 of FIG. 19 includes an example proximity sensor 1904, which is structured to measure the tip clearance 218 during operation. For example, the proximity sensor 1904 can be an inductive proximity sensor, an electromagnetic radiation sensor that looks for changes in an environment surrounding the sensor, and/or another proximity sensor that can detect tip clearance 218. The proximity sensor(s) 1904 is positioned at the rotor blade tips 214 and circumferentially so that the rotor blades 212 pass by the proximity sensor(s) 1904 in operation. The variable flowpath component 1900 can include any number of proximity sensors 1904. For example, the variable flowpath component 1900 can include a first proximity sensor 1904 at a first circumferential location and a second proximity sensor 1904 at a second circumferential location (e.g., for redundancy). In some examples, the proximity sensor(s) 1904 implements tip clearance detection means. In some examples, the proximity sensor 1904 identifies real time tip clearance 218 and transmits tip clearance 218 measurements to an example the example turbine engine controller system 1906.

The example turbine engine controller system 1906 can be, for example, a FADEC system, an electronic engine controller (ECC), an engine control unit (ECU), etc. The example turbine engine controller system 1906 is structured to monitor components of the turbine engine 100 (e.g., tip clearance 218, etc.) and to control an actuator(s) to increase engine performance. The turbine engine controller system 1906 is communicatively coupled to the example induction coil(s) 1902 that surround the actuator bar(s) 304.

In the example of FIG. 19, the turbine engine controller system 1906 monitors active tip clearance 218 during operation of the turbine engine 100 based on data from the proximity sensor(s) 1904. In response to identifying a tip clearance 218 above a defined (e.g., threshold) distance, the turbine engine controller system 1906 is structured to activate the induction coil(s) 1902 (e.g., for each variable flowpath component 1900 surrounding the rotor blades 212). For example, in response to identifying a relatively large tip clearance 218 (e.g., larger than 40 mils), the turbine engine controller system 1906 causes an a current to flow through the induction coil 1902 to heat the actuator bar 304. The induction coil 1902 heats the actuator bar 304, causing the actuator bar 304 to expand axially. The variable flowpath component 1900 is a smart structure than can respond to the change in temperature in a manner that maintains tip clearance 218. Thus, in some examples, the example variable flowpath component(s) 1900 of FIG. 19 implements FADEC controlled induction heating to expand the smart structure to mitigate open tip clearance.

While an example implementation of the variable flowpath component 1900 is illustrated in FIG. 19, one or more of the elements, processes, and/or devices illustrated in FIG. 19 may be combined, divided, re-arranged, omitted, eliminated, and/or implemented in any other way. Further, the example turbine engine controller system 1906, and/or, more generally, the example variable flowpath component 1900 of FIG. 19, may be implemented by hardware alone or by hardware in combination with software and/or firmware. Thus, for example, any of the example turbine engine controller system 1906, and/or, more generally, the example variable flowpath component 1900, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example variable flowpath component 1900 of FIG. 19 may include one or more elements, processes, and/or devices in addition to, or instead of, those illustrated in FIG. 19, and/or may include more than one of any or all of the illustrated elements, processes and devices.

Figure 20:
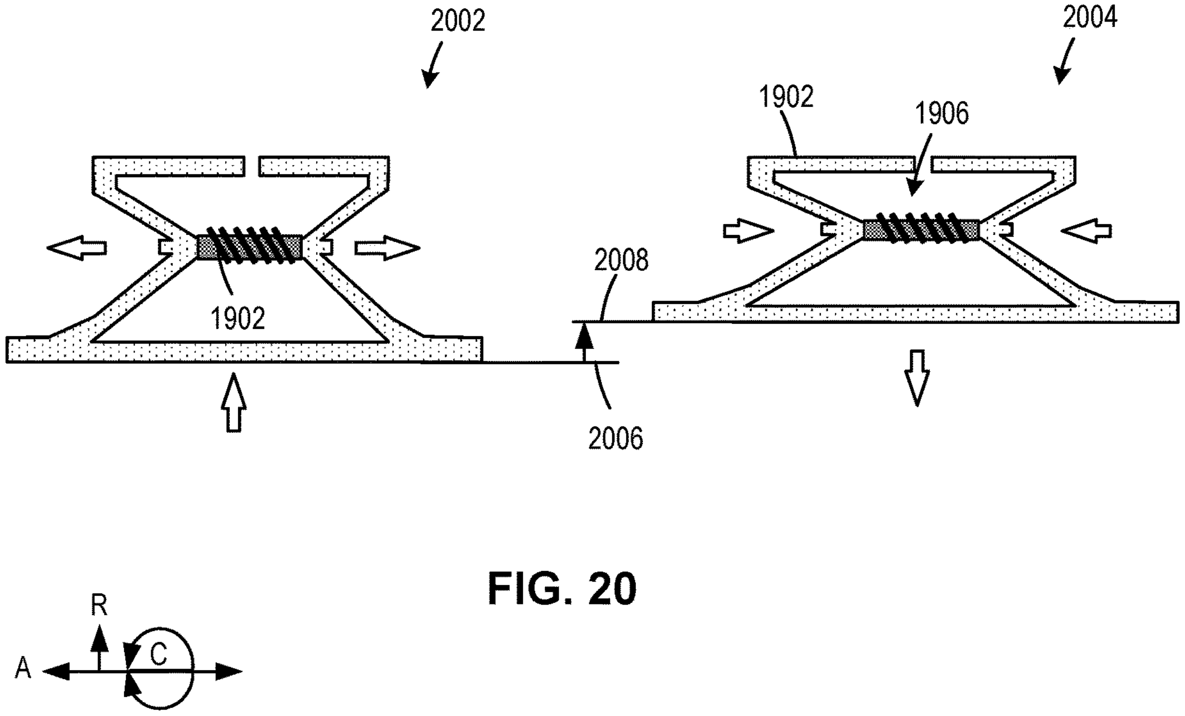
FIG. 20 illustrates the variable flowpath component of FIG. 19 in different positions in accordance with the teachings of this disclosure.

FIG. 20 illustrates the variable flowpath component 1900 of FIG. 19 in different positions in accordance with the teachings of this disclosure. Specifically, FIG. 20 illustrates the variable flowpath component 1900 in an example first position 2002 and an example second position 2004. The first position 2002 may be associated with a relatively low ambient air temperature. As such, the actuator bar 304 is contracted. In the first position 502, the variable surface 228 of the support structure 302 is at a first radial distance 2006 (e.g., measured to centerline axis 102).

Figure 21:
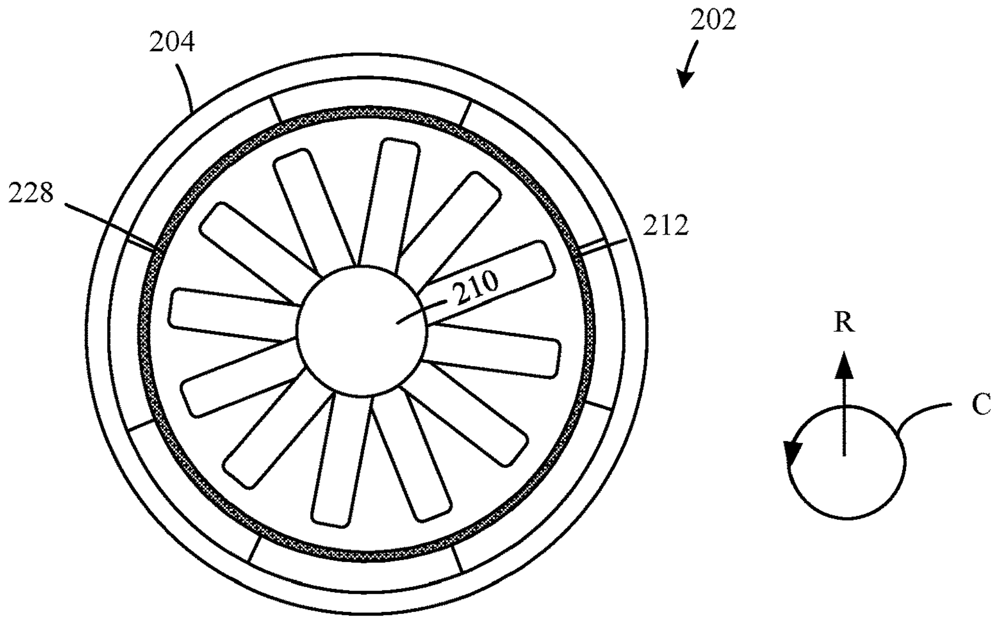
FIG. 21 is a partial circumferential view of an example variable flowpath casing with the variable flowpath component of FIG. 19 in accordance with the teachings of this disclosure.

In the example of FIG. 21, an example turbine engine controller system 1906 may determine that a tip clearance 218 is beyond a threshold value(s) (e.g., based on data from an example proximity sensor 1904). In some examples, the threshold value may be a maximum tip clearance 218 (e.g., 4% to 10% of a chord, over 40 mils, etc., depending on a type and/or application of the turbine engine 100). In some examples, the threshold value may be a value less than the maximum tip clearance 218, but larger than a desire tip clearance 218, such as larger than 4% of the chord, over 20 mils, etc. In response, the turbine engine controller system 1906 can send a flow of electronic current to an example induction coil 1902 to heat the actuator bar 304. As a temperature of the actuator bar 304 increases, the actuator bar 304 expands, applying an axial force on the axially constrained wishbone structures 306, 308. The force on the wishbone structures 306, 308 causes the variable surface 228 of the support structure 302 to move in a radially inward direction (e.g., towards the rotor blade tips 214) towards an example second radial distance 2008 of the second position 2004 to increase tip clearance 218. Accordingly, variable flowpath component 1900 of FIGS. 20 and 21 can implement an example active clearance control to maintain an open tip clearance 218 and prevent blade tip rubbing.

As ambient air surrounding the variable flowpath component 300 reduces in temperature, the actuator bar 304 contracts, pulling the wishbone structures 306, 308 towards each other. The force on the wishbone structures 306, 308 causes the variable surface 228 of the support structure 302 to move in a radially inward direction (e.g., towards a rotor blade tip 214) towards an example second radial distance 2008 associated with the second position 2004 of the variable flowpath component 1900. Accordingly, relatively low temperature ambient air can cool and contract the actuator bar 304, which pushes the variable surface 228 of the support structure radially inward to reduce tip clearance 218.

FIG. 21 is a partial circumferential view of an example variable flowpath casing 202 with the variable flowpath component 1900 of FIG. 19 in accordance with the teachings of this disclosure. The variable flowpath casing 202 of FIG. 21 surrounds and encloses the fan shaft 210 and the rotor blades 212. As illustrated in FIG. 21, the variable flowpath casing 202 includes a plurality of variable flowpath components 1900, which are positioned circumferentially around an inner surface 208 of the outer substrate 204. Example variable surfaces 228 of the variable flowpath components 1900, which include example abradable layers 230, are positioned radially outward from rotor blade tips 214 of the rotor blades 212. Tip clearance(s) 218 are illustrated between the rotor blade tips 214 and the abradable layer(s) 230.

The variable flowpath casing 202 and fan shaft 210 experience different loads during operation of the turbine engine 100 that affect tip clearance 218. However, the variable flowpath components 1900 actively control tip clearance 218 to mitigate issues with tip clearance. The variable flowpath component(s) 1900 is a smart structure that adjusts its height based on a temperature of the actuator bar 304 to provide blade-tip-to-casing clearance control.

Figure 22:
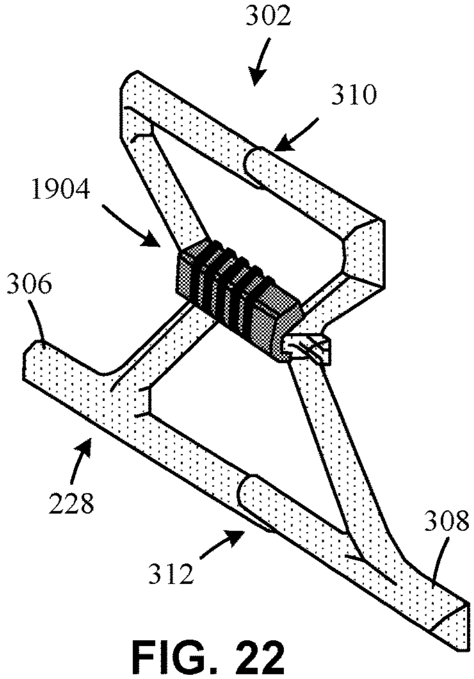
FIG. 22 is an illustration of a three-dimensional view of the example variable flowpath component(s) of FIGS. 19-21.

FIG. 22 is an illustration of a three-dimensional view of the example variable flowpath component(s) 1900 of FIGS. 19-21. The variable flowpath component 1900 includes the support structure 302 (e.g., the first wishbone structure 306 and the second wishbone structure 308, which are coupled at the radially outward region 310 and the radially inward region 312 of the support structure), the variable surface 228, and the actuator bar 304. Further, the variable flowpath component(s) 1900 include the example induction coil 1902 surround the actuator bar 304, which is structured to heat the actuator bar 304 to reduce tip clearance 218 (e.g., to prevent blade tip rubbing).

Figure 23:
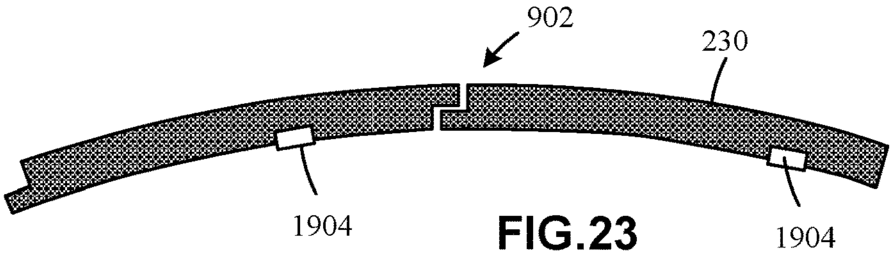
FIG. 23 is an illustration an example abradable layer(s) that can be included in example variable flowpath components disclosed herein.

FIG. 23 is an illustration an example abradable layer(s) 230 that can be coupled (e.g., applied) to a variable surface 228 of a variable flowpath component 1900 of FIGS. 19-22 in accordance with the teachings of this disclosure. As illustrated in FIG. 23, the abradable layer 230 is segmented to align with a respective variable flowpath component 1900. In the illustrated example of FIG. 23, the abradable layer(s) 230 includes an example rabbet(s) 902 at example circumferential ends 904 of the abradable layer 230. In the illustrated example of FIG. 23, the abradable layer(s) 230 include example proximity sensors 1904. While FIG. 23 illustrates each abradable layer 230 with a proximity sensor 1904, the variable flowpath casing 202 can include any number of proximity sensors 1904.

Figure 24:
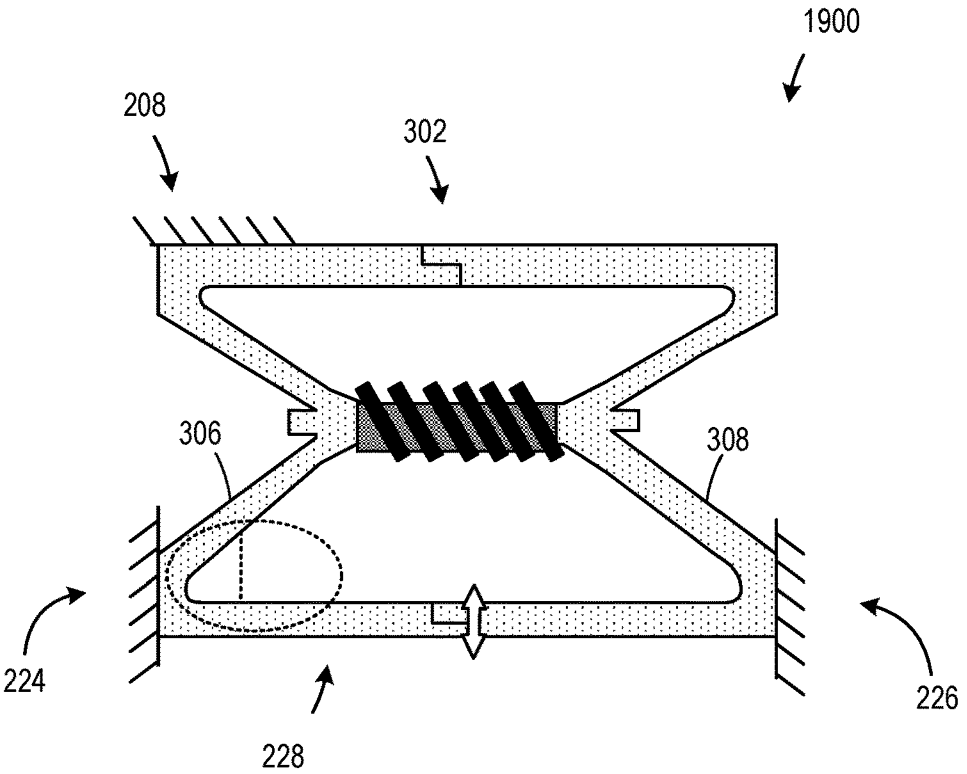
FIG. 24 illustrates example constrains of movement of the variable flowpath component of FIGS. 19-23.

FIG. 24 illustrates example constraints on an example support structure 302 of an example variable flowpath component(s) 300, 1900. In some examples, the support structure 302 is radially constrained at a radially outward surface by an inner surface 208 of the outer substrate 204. In some examples, the support structure 302 is axially constrained by a forward end 224 of the trench 222 (e.g., positioned forward of a rotor blade 212) and an aft end 226 of the trench 222 (e.g., positioned aft of the rotor blade 212). Further, the support structure 302 is circumferentially constrained by an example trench filler 232. As such, an axial force on the wishbone structures 306, 306 forces the support structure 302 to expand in a radial inward direction and contract in a radial outward direction (e.g., as far as the constraints permit).

Figure 25:
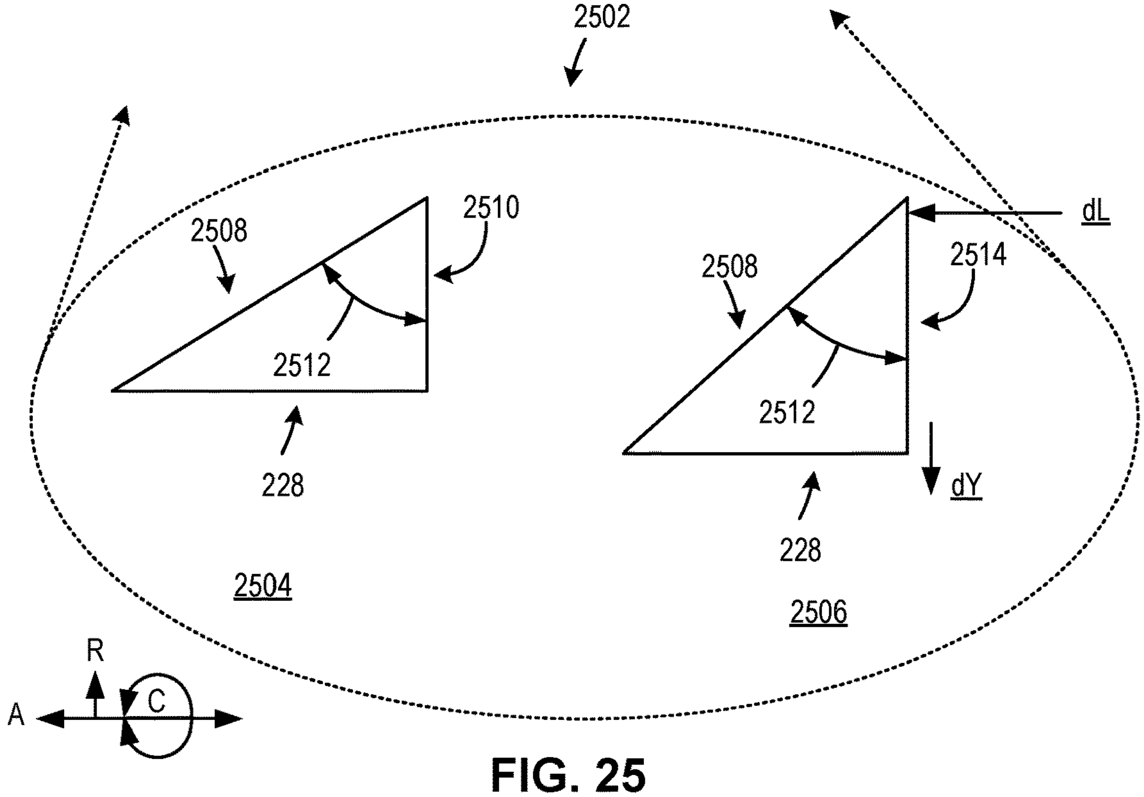
FIG. 25 illustrates example movement of the variable flowpath component of FIGS. 19-23.

FIG. 25 illustrates example radial motion of an example variable flowpath component 1900 that can successfully maintain a desired tip clearance 218. That is, FIG. 25 illustrates an effect of a change in temperature of an actuator bar 304 that causes the variable surface 228 to move radially inwards has at an example corner region 2502 of the support structure 302. The wishbone structures 306, 308 can be assumed to be partially defined by a triangular shape. For example, the wishbone structures 306 include a triangular shape at a radial inward, circumferential corner. FIG. 25 illustrates the corner region 2502 in an example first position 2504 and an example second position 2506. In the example of FIG. 25, the support structure 302 is made of a titanium alloy having an example CTE (α) of approximately 8*10^(−6) m/(m° C.). Further, the variable flowpath component 1900 experience a change in temperature (ΔT) of 300 degrees Fahrenheit.

In the first position 2504 of FIG. 25, the example corner region 2502 includes an example first side (e.g., corresponding to the variable surface 228), an example second side 2508, and an example third side 2510. The corner region 2502 includes an example angle 2512. In the example of FIG. 25, the angle is 60 degrees. In some examples, the second side 2508 has a length of 2 times an example length, X, of an example actuator bar 304 of the variable flowpath component 1900 of FIG. 25. In the example of FIG. 25, the first side (e.g., aft end 226) corresponds to the length, X, of the actuator bar 304 multiplied by the square root of 3. An example height of the third side 2510, which corresponds to a height of the support structure 302 in the first position 2504, is equal to the length, X, of the actuator bar 304. In response to the change in temperature, the third side 2510 experiences an example radial change, dy, towards an example third side 2514 in the second position 2506.

An example thermal expansion, dL, (e.g., a change in length (dL)) of the actuator bar 304 is defined by equation 1, above. Thus, the thermal expansion, dL, for the example of FIG. 25, ΔL, is 0.0039 times the example length, L, of the actuator bar 304 in the first position 2504. That is, the thermal expansion, dL, in the example of FIG. 25 is 0.39% of the length, L, of the actuator bar 304 in the first position 2504. For example, if the length, L, of the actuator bar 304 in the first position 2504 is 10 inches, the thermal expansion, dL, of the actuator bar 304 is 0.039 inches (e.g., 39 mils).

In response to the change in temperature, the third side 2510 experiences an example radial change, dy, towards an example third side 2514 in the second position 2506. For example, the third side 2514 in the second position 2506 can be determined by multiplying the square root of (4−(√3−(dL/2))) by the length, L, of the actuator bar 304 in the first position 2504. Thus, the third side 2514 is defined by a height of 1.00336 times the example length, L, of the actuator bar 304 in the first position 2504. Further, the radial change, dy, is 0.336% of the example length, L, of the actuator bar 304 in the first position 2504. In the example of FIG. 25, the length, L, of the actuator bar 304 in the first position 2504 is 10 inches. Therefore, the height of the third side 2514 in the second position 2506 is 33.6 mils. Typically, a desired tip clearance 218 is between 20 mils and 40 mils. According, the variable flowpath component 1900 of FIG. 25 successfully maintained a desired tip clearance 218.

Figure 26:
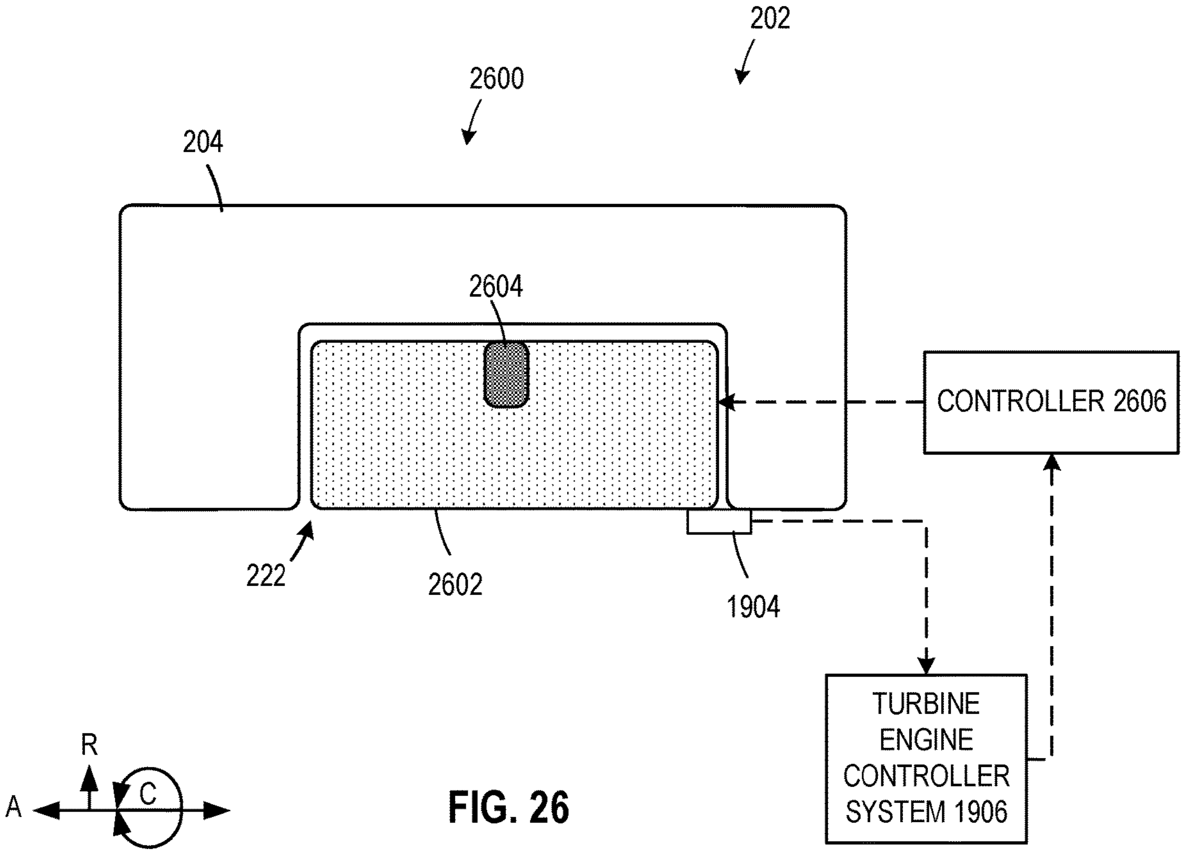
FIG. 26 is a schematic illustration of an example variable flowpath component for a variable flowpath casing constructed in accordance with the teachings of this disclosure.

FIG. 26 is a block diagram of another example variable flowpath component 2600 for a variable flowpath casing 202 constructed in accordance with the teachings of this disclosure. The variable flowpath component 2600 of FIG. 2600 implements an example active clearance control (ACC) system. As such, the variable flowpath component 1900 includes an example proximity sensor 1904, an example turbine engine controller system 1906, an example support structure 2602, and an example actuator structure 2604. In some examples, the variable flowpath component 2600 implements actuation means. The example support structure 2602 is axially constrained by additional support structures 2602 of other variable flowpath components 2600 that circumferentially surround the rotor blades 212. Further, the support structure 2602 is circumferentially constrained by example trench filler. The support structure 2602, which is manufactured using a material associated with a relatively low CTE, responds to a change in temperature at a relatively slow rate. In some examples, the support structure 2602 implements support means.

The example actuator structure 2604 is operatively coupled to the example support structure 2602. The actuator structure 2604 can be manufactured using an example smart material, such as a SMA, a bi-metallic material, etc. In the example of FIG. 26, the actuator structure 2604 is made of a material associated with a relatively high CTE. Therefore, the actuator structure 2604 response to a change in temperature at a relatively fast rate. In some examples, the actuator structure 2604 implements movement means.

The proximity sensor 1904 is structured to measure the tip clearance 218. The proximity sensor(s) 1904 is positioned at the rotor blade tips 214 and circumferentially so that the rotor blades 212 pass by the proximity sensor(s) 1904 in operation. In some examples, the proximity sensor 1904 identifies real time tip clearance 218 and transmits tip clearance 218 measurements to an example the example turbine engine controller system 1906. The example turbine engine controller system 1906 is structured to monitor components of the turbine engine 100 (e.g., tip clearance 218, etc.) and to control an actuator(s) to increase engine performance.

In the example of FIG. 26, the turbine engine controller system 1906 monitors active tip clearance 218 during operation of the turbine engine 100 based on data from the proximity sensor(s) 1904. The turbine engine controller system 1906 is communicatively coupled to an example controller 2606. In response to identifying a tip clearance 218 above a defined (e.g., threshold) distance, the turbine engine controller system 1906 is structured to instruct an example controller 2606 to cause an inflow of hot liquid (e.g., oil, lube, etc.) to heat to heat the actuator structure 2604. In some examples, the inflow of hot liquid implements external heat means. In some examples, the controller 2606 causes bleed air (e.g., from a variable bleed valve) to traverse and consequently heat the actuator structure 2604. The controller 2606 can cause other types of heat supply in additional or alternative examples. In some examples, the variable flowpath component 2600 of FIG. 26 implements an example control system to maintain a compliant tip clearance 218 between the variable flowpath casing 202 and rotor blade tips 214 throughout a work cycle (e.g., during a flight of an airplane).

Figure 27:
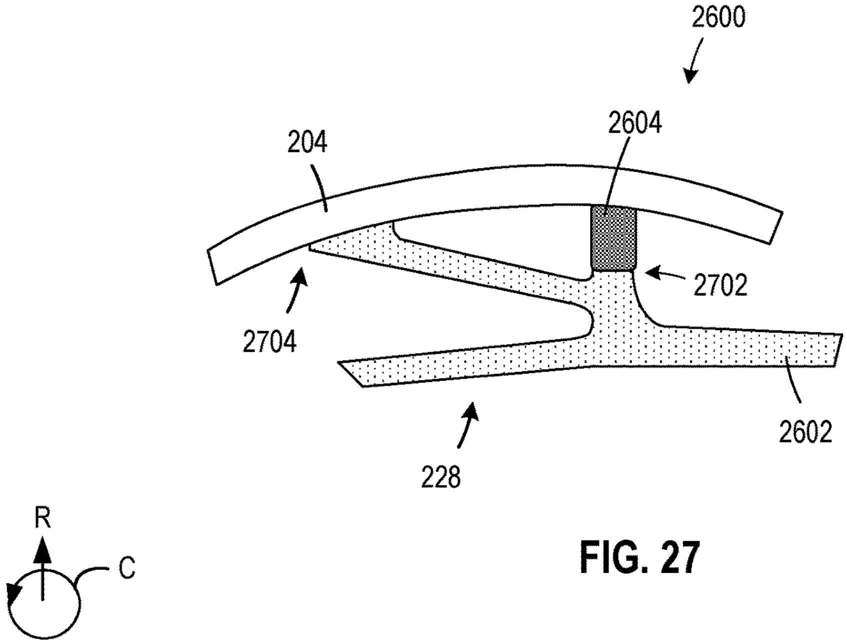
FIG. 27 is a partial circumferential view of an example variable flowpath component of FIG. 26

FIG. 27 is a partial circumferential view of an example variable flowpath component 2600 of FIG. 26. The variable flowpath component 2600 includes the example actuator structure 2604, which is structured to expand in response to an inflow of a hot liquid. The support structure 2602 is coupled to the outer substrate 204 at an example first connection region (e.g., connection point, etc.) 2702 of the outer substrate 204. The actuator structure 2604, which is coupled to the support structure 2602 at an example second connection region 2704, expands when upon the increased temperature, forcing a variable surface 228 of the support structure 2602 to move radially inward to reduce tip clearance 218. As ambient air surrounding the variable flowpath component 2600 reduces in temperature, the support structure 2602 contracts, pulling the variable surface 228 radially inward to increase tip clearance 218.

Figure 28:
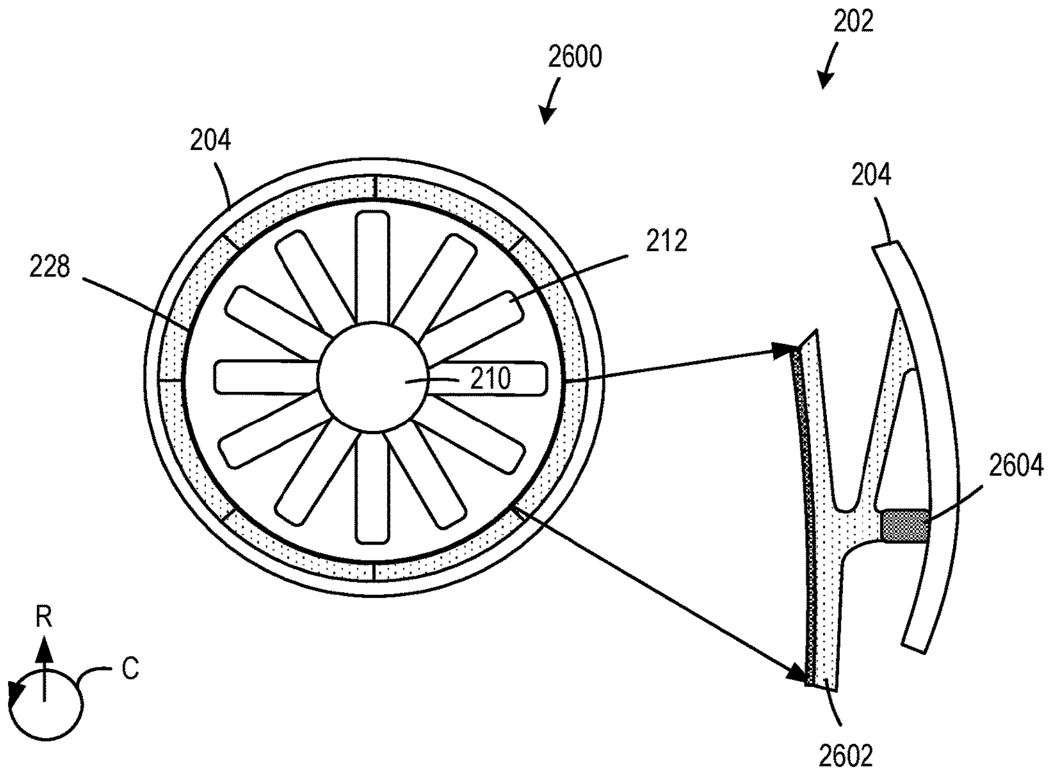
FIG. 28 is a schematic circumferential cross-sectional view of an example variable flowpath casing with the example variable flowpath component(s) of FIGS. 26-27 in accordance with the teachings of this disclosure.

FIG. 28 is a schematic circumferential cross-sectional view of an example variable flowpath casing 202 with the example variable flowpath component(s) 2600 of FIGS. 26-27 in accordance with the teachings of this disclosure. The variable flowpath casing 202 of FIG. 28 surrounds and encloses the fan shaft 210 and the rotor blades 212 of the turbine engine 100. As illustrated in FIG. 28, the variable flowpath casing 202 includes a plurality of variable flowpath components 2600, which are positioned circumferentially around an inner surface 208 of the outer substrate 204. Example variable surfaces 228 of the variable flowpath components 2600, which include example abradable layers 230, are positioned radially outward from rotor blade tips 214 of the rotor blades 212. Tip clearance(s) 218 are illustrated between the rotor blade tips 214 and the abradable layer(s) 230.

The variable flowpath casing 202 and fan shaft 210 experience different loads during operation of the turbine engine 100 that affect tip clearance 218. However, the variable flowpath component(s) 2600 is a smart structure that adjusts its height based on a temperature change caused by a heat source to provide blade-tip-to-casing clearance control. Therefore, the variable flowpath components 300 that circumferentially surround the rotor blade tips 214 passively control tip clearance 218 to mitigate issues with tip clearance.

Figure 29:
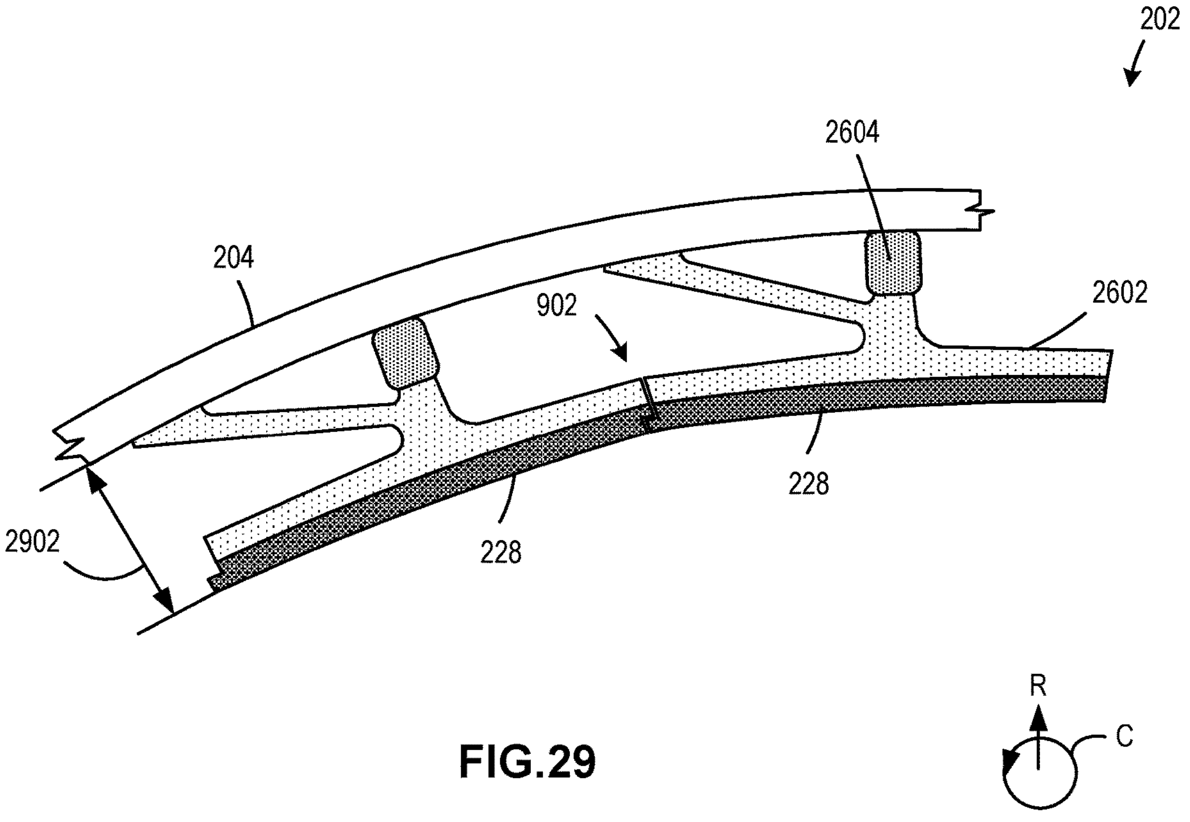
FIG. 29 is a partial circumferential view of an of the variable flowpath casing with two example variable flowpath components of FIGS. 26-28.

FIG. 29 is a partial circumferential view of the variable flowpath casing 202 with two example variable flowpath components 2600. In the example of FIG. 29, the variable flowpath component(s) 2600 implement example casing sleeve attachments that are smart materials configured for radial movement. In the example of FIG. 29, the support structure 2602 of the variable flowpath component 2600 is made of an aluminum alloy having a relatively high CTE (a) of 13*10^−6/F. The support structure 2602 of FIG. 29 is at a position associated with an example length, L, 2902 of 2 inches. An increase in temperature (ΔT) based on heat exchange with from an actuator structure 2604 (e.g., lube oil, bleed air, etc.) is 250 degrees Fahrenheit. An example thermal expansion, dL, (e.g., a change in length (dL) is defined by equation 1, above. Thus, the thermal expansion, dL, for the example of FIG. 29, ΔL, is 0.0065 inches. As such, an example radial rate of change, dR, is 6.5 mils (e.g., variable surface 228 moves radially inward by 6.5 mils).

While an example implementation of the variable flowpath component 2600 is illustrated in FIG. 26, one or more of the elements, processes, and/or devices illustrated in FIG. 26 may be combined, divided, re-arranged, omitted, eliminated, and/or implemented in any other way. Further, the example turbine engine controller system 1906, example controller 2606, and/or, more generally, the example variable flowpath component 2600 of FIG. 26, may be implemented by hardware alone or by hardware in combination with software and/or firmware. Thus, for example, any of the example turbine engine controller system 1906, example controller 2606, and/or, more generally, the example variable flowpath component 2600, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example variable flowpath component 2600 of FIG. 26 may include one or more elements, processes, and/or devices in addition to, or instead of, those illustrated in FIG. 26, and/or may include more than one of any or all of the illustrated elements, processes and devices.

Figure 30:
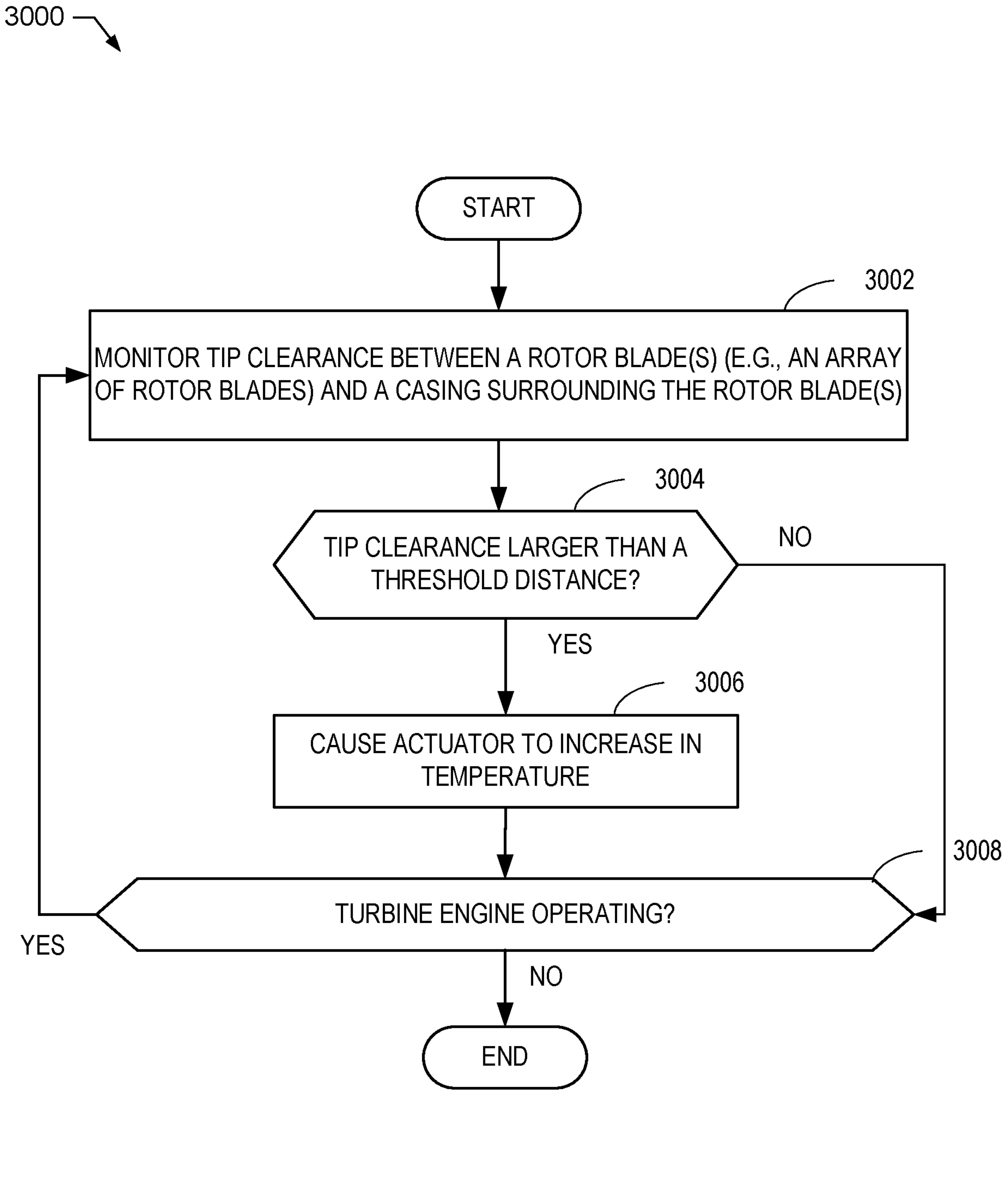
FIG. 30 is a flowchart representative of example machine readable instructions and/or example operations that may be executed by example processor circuitry to implement the example variable flowpath components of FIG. 19 and/or FIG. 23.

A flowchart representative of example hardware logic circuitry, machine readable instructions, hardware implemented state machines, and/or any combination thereof for implementing the variable flowpath component(s) 1900, 2600 of FIGS. 19 and/or 26 is shown in FIG. 30. The machine readable instructions may be one or more executable programs or portion(s) of an executable program for execution by processor circuitry, such as the processor circuitry 3112 shown in the example processor platform 3100 discussed below in connection with FIG. 31. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 19 and/or 26, many other methods of implementing the example variable flowpath component(s) 1900, 2600 of FIGS. 19 and/or 26 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 30 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 30 is a flowchart representative of example machine readable instructions and/or example operations 3000 that may be executed and/or instantiated by processor circuitry to actuate an example variable flowpath component. The machine readable instructions and/or the operations 3000 of FIG. 30 begin at block 3002, at which an example turbine engine controller system 1906 monitors tip clearance 218 between a rotor blade(s) 132, 152, 156, 212 (e.g., an array of rotor blades) and blade tip region 216 of a casing 108, 134, 138, 202 surrounding the rotor blades. For example, the turbine engine controller system 1906 can receive sensor data from an example proximity sensor (e.g., proximity sensor 1904) to determine tip clearance 218 (e.g., in real time).

At block 3004, the turbine engine controller system 1906 determines whether the tip clearance 218 is larger than a threshold distance (e.g., 40 mils, etc.). If the answer to block 3004 is NO, control advances to block 3008. If the answer to block 3004 is YES, control advances to block 3006 at which the turbine engine controller system 1906 and/or an example controller 2606 causes an example actuator (e.g., actuator bar 304, actuator structure 2604) to increase in temperature to decrease a tip clearance 218. Control then advances to block 3008.

At block 3008 the turbine engine controller system 1906 determines whether the turbine engine 100 is operating. If the answer to block 3008 is YES, control returns to block 3002 at which turbine engine controller system 1906 continues to monitor tip clearance 218.

Figure 31:
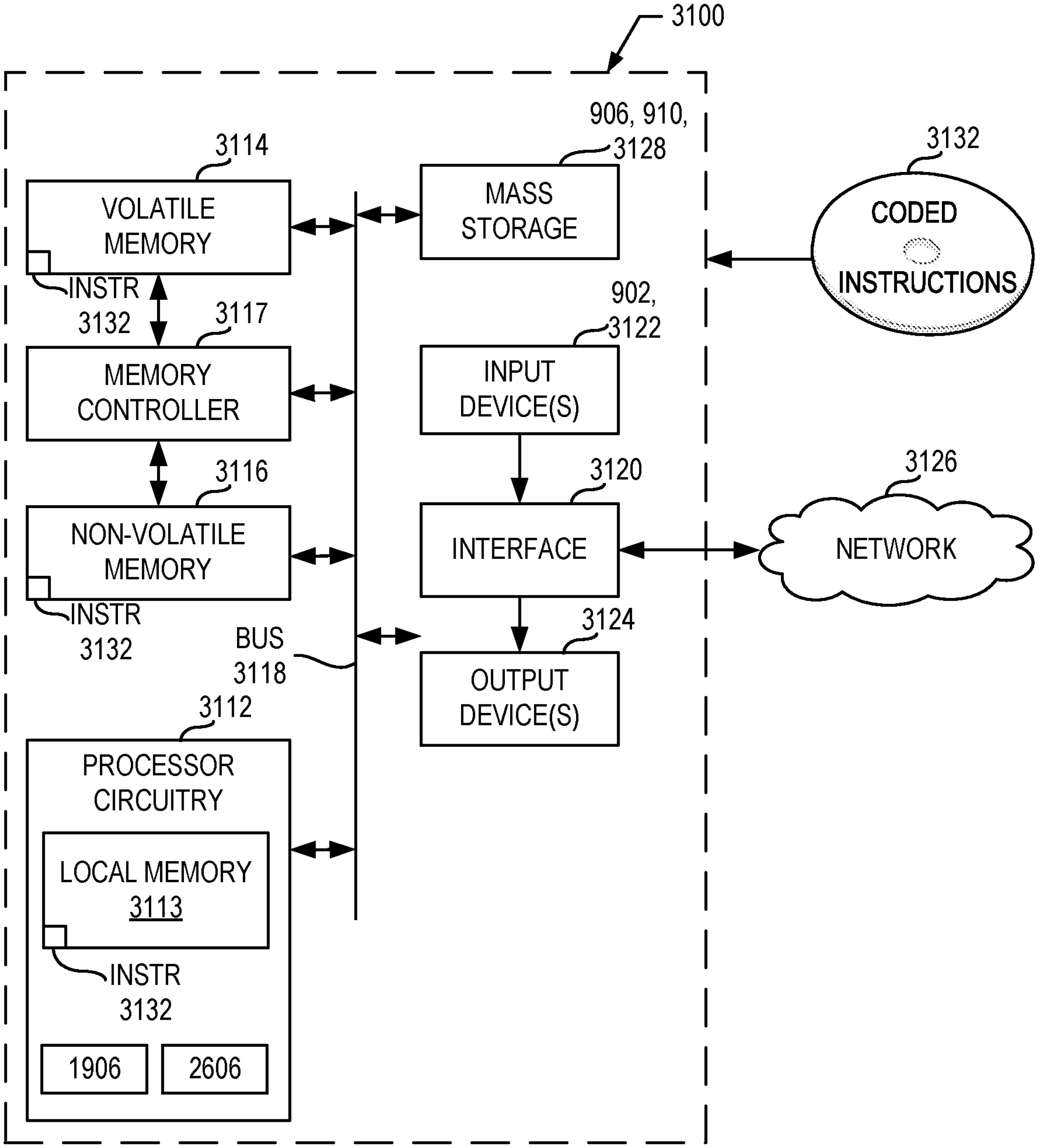
FIG. 31 is a block diagram of an example processing platform including processor circuitry structured to execute the example machine readable instructions and/or the example operations of FIG. 30 to implement the example variable flowpath components of FIG. 19 and/or FIG. 23.

FIG. 31 is a block diagram of an example processor platform 3100 structured to execute and/or instantiate the machine readable instructions and/or the operations of FIG. 30 to implement the variable flowpath component(s) 1900, 2600 of FIGS. 19 and/or 26. The processor platform 3100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset (e.g., an augmented reality (AR) headset, a virtual reality (VR) headset, etc.) or other wearable device, or any other type of computing device.

The processor platform 3100 of the illustrated example includes processor circuitry 3112. The processor circuitry 3112 of the illustrated example is hardware. For example, the processor circuitry 3112 can be implemented by one or more integrated circuits, logic circuits, FPGAs, microprocessors, CPUs, GPUs, DSPs, and/or microcontrollers from any desired family or manufacturer. The processor circuitry 3112 may be implemented by one or more semiconductor based (e.g., silicon based) devices. In this example, the processor circuitry 3112 implements example turbine engine controller system 1906, example controller 2606, etc.

The processor circuitry 3112 of the illustrated example includes a local memory 3113 (e.g., a cache, registers, etc.). The processor circuitry 3112 of the illustrated example is in communication with a main memory including a volatile memory 3114 and a non-volatile memory 3116 by a bus 3118. The volatile memory 3114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 3116 may be implemented by flash memory and/or any other desired type of memory device. Access to the main memory 3114, 3116 of the illustrated example is controlled by a memory controller 3117.

The processor platform 3100 of the illustrated example also includes interface circuitry 3120. The interface circuitry 3120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 3122 are connected to the interface circuitry 3120. The input device(s) 3122 permit(s) a user to enter data and/or commands into the processor circuitry 3112. The input device(s) 3122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 3124 are also connected to the interface circuitry 3120 of the illustrated example. The output device(s) 3124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 3120 of the illustrated example, thus, typically includes a graphics driver card, a graphics driver chip, and/or graphics processor circuitry such as a GPU.

The interface circuitry 3120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 3126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 3100 of the illustrated example also includes one or more mass storage devices 3128 to store software and/or data. Examples of such mass storage devices 3128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 3132, which may be implemented by the machine readable instructions of FIG. 31, may be stored in the mass storage device 3128, in the volatile memory 3114, in the non-volatile memory 3116, and/or on a removable non-transitory computer readable storage medium such as a CD or DVD.

From the foregoing, it will be appreciated that example variable flowpath casing are disclosed herein that enable blade-tip-to-casing clearance control. Example variable flowpath casings disclosed herein include a variable flowpath surface implemented by an example variable flowpath mechanism to manage tip clearance. Example variable flowpath components disclosed herein can adjust a surface of an example variable flowpath casing to reduce a tip clearance that is larger than a desired tip clearance or to increase a tip clearance that is smaller than a desire tip clearance. Controlled tip clearance between a rotor blade and a casing can be a challenge due to differential thermal expansion of the rotor blade(s) material and casing material. Examples disclosed herein provide a system level architecture for blade tip clearance control based on an example smart structure that expands and/or contracts in response to a temperature change.

Further aspects of the present disclosure are provided by the subject matter of the following clauses:

Example 1 includes a casing for a turbine engine, the casing comprising an annular substrate extending along an axial direction, the annular substrate defining a cavity at a radially inward surface of the annular substrate; a smart structure coupled to the annular substrate, the smart structure including a support structure; an actuator structure to at least one of expand or contract in response to a change in temperature of the actuator structure; and a variable surface coupled to the support structure, the support structure to move the variable surface in a radial direction.

Example 2 includes the casing of any preceding clause, wherein the actuator structure at least one of expands or contracts in response to a change in temperature of ambient air surrounding the actuator structure.

Example 3 includes the casing of any preceding clause, further including an external heat supply, the external heat supply to cause the change in the temperature of the actuator structure to cause the actuator structure to expand.

Example 4 includes the casing of any preceding clause, wherein the external heat supply is at least one of (a) an induction coil or (b) an inflow of a liquid, the liquid having a temperature that is higher than a temperature of the actuator structure.

Example 5 includes the casing of any preceding clause, wherein the casing surrounds a rotor blade of the turbine engine, and wherein the actuator structure includes a smart material having a positive coefficient of thermal expansion (CTE) that is higher than a CTE of each of (a) a first material corresponding to the support structure and (b) a second material corresponding to the rotor blade.

Example 6 includes the casing of any preceding clause, wherein the support structure is coupled to the actuator structure at a first region and to the variable surface at a second region, and wherein the actuator structure is to expand in the radial direction in response to an increase in temperature to cause the support structure to move the variable surface in a radially inward direction, and wherein the actuator structure is to contract in the radial direction in response to a decrease in temperature to cause the support structure to move the variable surface in a radially outward direction.

Example 7 includes the casing of any preceding clause, wherein the actuator structure defines a length and a cross-section, and wherein the cross section is at least one of (a) a circular cross section, (b) an ovular cross section, (c) a rectangular cross section, or (d) a triangular cross section.

Example 8 includes the casing of any preceding clause, wherein the support structure is a sectored wishbone-type structure coupled at a first region and a second region, the support structure constrained in the axial direction, a radially inward surface of the support structure to be the variable surface, and wherein the actuator structure is coupled to the support structure at a third region radially between the first region and the second region.

Example 9 includes the casing of any preceding clause, wherein the sectored wishbone-type structure includes a first wishbone structure and a second wishbone structure, the actuator structure coupled to the first wishbone structure at a first axial position of the third region and to the second wishbone structure at a second axial position of the third region, wherein the actuator structure is to expand in the axial direction in response to an increase in temperature to cause the variable surface of the support structure to move in a radially outward direction, and wherein the actuator structure is to contract in the axial direction in response to a decrease in temperature to cause the variable surface of the support structure to move in a radially inward direction.

Example 10 includes the casing of any preceding clause, wherein the casing includes a plurality of actuator structures, the plurality of actuator structures to implement the support structure, the plurality of actuator structures include a smart material having a negative coefficient of thermal expansion, and wherein the variable surface is a shroud segment, the plurality of actuator structures operatively coupled to the shroud segment.

Example 11 includes the casing of example 9, wherein the actuator structures are to expand in response to a decrease in temperature to cause the variable surface to move in a radially inward direction, and wherein the actuator structures are to contract in response to an increase in temperature to cause the variable surface to move in a radially outward direction.

Example 12 includes the casing of any preceding clause, wherein the variable surface is a shroud segment, wherein the support structure is to guide the shroud segment as the shroud segment moves in the radial direction, and wherein the shroud segment is coupled to a first actuator structure at a first end of the shroud segment and to a second actuator structure at a second end of the shroud segment, each of the first actuator structure and the second actuator structure to include a lever arm rotatably coupled to a first side of the shroud segment at a first connection point of the lever arm; an outer linkage coupled to the annular substrate at a first end of the outer linkage, the outer linkage extending radially inward, a second end of the outer linkage rotatably coupled to the lever arm at a second connection point of the lever arm; and an inner linkage coupled to the outer substrate at a first end of the inner linkage, the inner linkage extending radially inward, a second end of the inner linkage rotatably coupled to the lever arm at a third connection point of the lever arm that is circumferentially between the first connection point and the second connection point.

Example 13 includes the casing of any preceding clause, wherein, the lever arm and the outer linkage include a first smart material having a negative coefficient of thermal expansion (CTE), and wherein the inner linkage includes a second smart material having a positive CTE that is relatively high compared to a CTE of the support structure.

Example 14 includes the casing of any preceding clause, wherein the outer linkage expands in response to a decrease in temperature and the inner linkage contracts in response to the decrease in temperature, the lever arm to rotate causing the variable surface to move radially inwards.

Example 15 includes the casing of any preceding clause, wherein the outer linkage contracts in response to an increase in temperature and the inner linkage expands in response to the increase in temperature, the lever arm to rotate causing the variable surface to move radially outwards.

Example 16 includes the casing of any preceding clause, further including a proximity sensor to detect a tip clearance between the variable surface and a tip of a rotor blade that is radially inward from the variable surface.

Example 17 includes a turbine engine comprising a rotor blade extending from a rotor end radially outward to a rotor blade tip; and a variable flowpath casing to surround the rotor blade, the variable flowpath casing including an outer shell; a variable surface radially adjacent the rotor blade tip, the variable surface associated with a clearance between the variable surface and the rotor blade tip; and a smart structure coupled to the outer shell and to the variable surface, the smart structure to cause the variable surface to move in a radially outward direction in response to an increase in temperature of ambient air surrounding the rotor blade, the smart structure to cause the variable surface to move in a radially inward direction in response to a decrease in temperature of ambient air surrounding the rotor blade.

Example 18 includes the casing of any preceding clause, wherein the ambient air further surrounds the smart structure, and wherein the smart structure includes a first actuator structure coupled to the outer shell at a radially outward end of the first actuator structure and to a first circumferential side of the variable surface at a radially inward end of the first actuator structure; a second actuator structure coupled to the outer shell at a radially outward end of the second actuator structure and to a second circumferential side of the variable surface at a radially inward end of the second actuator structure; wherein the first and second actuator structures include a material associated with a negative coefficient of thermal expansion, the first and second actuator structures to expand in response to the decrease in the temperature of the ambient air to cause the variable surface to move in the radially inward direction, the first and second actuator structures to contract in response to the increase in the temperature of the ambient air to cause the variable surface to move in the radially outward direction.

Example 19 includes the casing of any preceding clause, wherein the ambient air further surrounds the smart structure, and wherein the smart structure includes a coupled wishbone structure, the coupled wishbone structure including a first wishbone-type structure coupled to a second wishbone-type structure at radial outward point and a radially inward point, the coupled wishbone structure axially constrained by the outer shell; an abradable material coupled to a radially inward surface of the coupled wishbone structure, the abradable material to implement the variable surface; and an actuator rod including a material associated with a first relatively high coefficient of thermal expansion (CTE) that is relatively high as compared to (a) a second CTE of the coupled wishbone structure and (b) a third CTE of the rotor blade, the actuator rod operatively coupled to the first wishbone-type structure at a first axial point of the coupled wishbone structure and to the second wishbone-type structure at a second axial point of the coupled wishbone structure.

Example 20 includes the casing of any example 18, wherein the actuator rod axially expands in response to the increase in the temperature of the ambient air to force the axially constrained coupled wishbone structure to move in the radially inward direction, causing the variable surface to move in the radially inward direction to reduce the clearance between the variable surface and the rotor blade tip, and wherein to the actuator rod axially contracts in response to the decrease in the temperature of the ambient air to force the coupled wishbone structure to move in a radially outward direction, causing the variable surface to move in the radially outward direction to increase clearance between the variable surface and the rotor blade tip.

Example 21 includes the casing of any preceding clause, wherein the variable flowpath casing further includes a sensor to detect the clearance between the variable surface and the rotor blade tip, the sensor communicatively coupled to a controller; and an induction coil surrounding the actuator rod, the controller communicatively coupled to the induction coil, the controller to cause the induction coil to increase a temperature of the actuator rod; wherein the controller causes the induction coil to increase a temperature of the actuator rod in response to the sensor detecting the clearance that is beyond a threshold value, and wherein, in response to the increase in the temperature of the actuator rod, the actuator rod axially expands to move the axially constrained coupled wishbone structure in the radially inward direction to cause the variable surface to move in the radially inward direction to reduce clearance between the variable surface and the rotor blade tip.

Example 22 includes a casing for a turbine engine, the casing comprising an substrate means to circumferentially surround a component of the turbine engine, the substrate means extending along an axial direction, the substrate means defining a cavity at a radially inward surface of the substrate means; actuation means coupled to the substrate means, that actuation means including movement means, the movement means to move the actuation means in response to a change in temperature of the movement means; and variable surface means coupled to the actuation means, the actuation means to move the variable surface means in a radial direction.

Example 23 includes the casing of any preceding clause, wherein the movement means is to at least one of expand or contract in response to a change in temperature of ambient air surrounding the movement means.

Example 24 includes the casing of any preceding clause, further including external heat means, the external heat means to cause the change in the temperature of the movement means to cause the movement means to expand.

Example 25 includes the casing of any preceding clause, wherein the external heat means is at least one of (a) an induction coil or (b) an inflow of a liquid, the liquid having a temperature that is higher than a temperature of the movement means.

Example 26 includes the casing of any preceding clause, wherein the casing surrounds a rotor blade of the turbine engine, wherein the actuation means includes support means, and wherein the movement means includes a smart material having a positive coefficient of thermal expansion (CTE) that is higher than a CTE of each of (a) a first material corresponding to the support means and (b) a second material corresponding to the rotor blade.

Example 27 includes the casing of any preceding clause, wherein the actuation means is coupled to the substrate means at a first region and to the variable surface means at a second region, and wherein the movement means is to expand in the radial direction in response to an increase in temperature to cause the actuation means to move the variable surface means in a radially inward direction, and wherein the movement means is to contract in the radial direction in response to a decrease in temperature to cause the actuation means to move the variable surface means in a radially outward direction.

Example 28 includes the casing of any preceding clause, wherein the movement means defines a length and a cross-section, and wherein the cross section is at least one of (a) a circular cross section, (b) an ovular cross section, (c) a rectangular cross section, or (d) a triangular cross section.

Example 29 includes the casing of any preceding clause, wherein the actuation means includes support means, the support means including first support means and second support means, the first support means coupled to the second support means at a first region and a second region, the support means constrained in the axial direction, a radially inward surface of the support means to implement the variable surface means, and wherein the movement means is coupled to the support means at a third region radially between the first region and the second region.

Example 30 includes the casing of any preceding clause, wherein the movement means is coupled to the first support means at a first axial position of the third region and to the second support means at a second axial position of the third region, wherein the movement means is to expand in the axial direction in response to an increase in temperature to cause the variable surface means of the support means to move in a radially outward direction, and wherein the movement means is to contract in the axial direction in response to a decrease in temperature to cause the variable surface means of the support means to move in a radially inward direction.

Example 31 includes the casing of any preceding clause, wherein the casing includes a plurality of actuation means, the plurality of actuation means including a smart material having a negative coefficient of thermal expansion, and wherein the variable surface means is a shroud segment, the plurality of actuation means operatively coupled to the shroud segment.

Example 32 includes the casing of example 9, wherein the plurality of the actuation means are to expand in response to a decrease in temperature to cause the variable surface means to move in a radially inward direction, and wherein the plurality of the actuation means are to contract in response to an increase in temperature to cause the variable surface means to move in a radially outward direction.

Example 33 includes the casing of any preceding clause, wherein the movement means is first movement means, the first movement means coupled to the substrate means at a first end of the first movement means, the first movement means extending radially inward from the substrate means, the casing further including: second movement means, the second movement means coupled to the substrate means at a first end of the second movement means, the second movement means extending radially inward from the substrate mean; and lever means, the lever means coupled to the variable surface means at a first connection point of the lever means, a second end of the first movement means rotatably coupled to the lever means at a second connection point of the lever means, a second end of the second movement means rotatably coupled to the lever means at a third connection point of the lever means that is circumferentially between the first connection point and the second connection point.

Example 34 includes the casing of any preceding clause, wherein, the lever means and the first movement means include a first smart material having a negative coefficient of thermal expansion (CTE), and wherein the second movement means includes a second smart material having a positive CTE that is relatively high compared to a CTE of the variable surface means.

Example 35 includes the casing of any preceding clause, wherein the first movement means expand in response to a decrease in temperature and the second movement means contract in response to the decrease in temperature, the lever means to rotate causing the variable surface means to move radially inwards.

Example 36 includes the casing of any preceding clause, wherein the first movement means contract in response to an increase in temperature and the second movement means expand in response to the increase in temperature, the lever means to rotate causing the variable surface means to move radially outwards.

Example 37 includes the casing of any preceding clause, further including tip clearance detection means to detect a tip clearance between the variable surface means and a tip of a rotor blade that is radially inward from the variable surface means.

Example 38 includes a method for controlling tip clearance comprising monitoring a tip clearance between a rotor blade and a radially inward surface of a casing surrounding the rotor blade, and, in response to detecting the tip clearance that is beyond a defined value, transmitting a signal to a controller to cause an increase in a temperature of an actuator that includes a first coefficient of thermal expansion (CTE) that is higher than a CTE of a material coupled to the actuator, the actuator to expand in response to the increase in the temperature.

Example 39 includes the method of any preceding clause, wherein the monitoring is based on signals output by a proximity sensor, the proximity sensor positioned between a tip of the rotor blade and the radially inward surface of the casing.

Example 40 includes the method of any preceding clause, wherein the controller causes the increase in the temperature of the actuator by causing an alternating current (AC) to flow through an induction coil surrounding the actuator, the induction coil to induce a current in the actuator.

Example 41 includes the method of any preceding clause, wherein the controller causes the increase in the temperature of the actuator by causing an inflow of a liquid associated with a temperature higher than a temperature of the actuator to flow into the actuator to cause the actuator to increase in temperature.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A casing for a turbine engine, the casing comprising:
- an annular substrate extending along an axial direction, the annular substrate including a first surface, a second surface, and a third surface, the second surface positioned radially inward relative to the first surface and radially outward relative to the third surface to form a trench;
- an actuator structure coupled to the third surface of the annular substrate;
- a smart structure cantilevered from the third surface of the annular substrate, the smart structure including:
  - a support structure, a first region of the support structure coupled to the third surface of the annular substrate, a second region of the support structure coupled to the actuator structure; and
  - a radially inward surface defining a variable surface, the support structure to move the variable surface in a radial direction; and
- a filler material positioned within an area of the trench that is not occupied by the smart structure.

2. The casing of claim 1, wherein the support structure includes a material associated with a first coefficient of thermal expansion and the actuator structure includes a material associated with a second coefficient of thermal expansion, the second coefficient of thermal expansion to be higher than the first coefficient of thermal expansion.

3. The casing of claim 1, wherein the actuator structure at least one of expands or contracts in response to a change in temperature.

4. The casing of claim 3, wherein the actuator structure is to expand in the radial direction in response to an increase in temperature to cause the support structure to move the variable surface in a radially inward direction, and wherein the actuator structure is to contract in the radial direction in response to a decrease in temperature to cause the support structure to move the variable surface in a radially outward direction.

5. The casing of claim 3, further including an external heat supply, the external heat supply to cause the change in the temperature of the actuator structure to cause the actuator structure to expand.

6. The casing of claim 5, wherein the external heat supply is at least one of (a) an induction coil or (b) an inflow of a liquid, the liquid having a temperature that is higher than a temperature of the actuator structure.

7. The casing of claim 1, further including a proximity sensor to detect a tip clearance between the variable surface and a tip of a rotor blade that is radially inward from the variable surface.

8. The casing of claim 1, wherein the support structure is axially constrained.

9. The casing of claim 1, wherein the support structure is circumferentially constrained.

10. The casing of claim 1, wherein the variable surface includes an abradable material coupled thereto.

11. The casing of claim 1, wherein the variable surface includes an abradable material coupled thereto, the abradable material including a first rabbet at a circumferential end of the abradable material that opposes a second rabbet of an adjacent abradable material of an adjacent variable surface.

12. A casing for a turbine engine, the casing comprising:
- substrate means to circumferentially surround a component of the turbine engine, the substrate means having an inner surface and an outer surface, the substrate means extending along an axial direction, the substrate means including a recessed surface positioned radially inward relative to the outer surface and radially outward relative to the inner surface to form a trench, the trench including a filler material;
- actuation means coupled to the recessed surface of the substrate means, the actuation means including movement means, the movement means to move the actuation means in response to a change in temperature of the movement means;
- support means cantilevered from the recessed surface of the substrate means, the support means operatively coupled to the actuation means, the filler material positioned in an area of the trench not occupied by the actuation means and the support means; and
- variable surface means, the support means to move the variable surface means in a radial direction.

13. The casing of claim 12, wherein the casing surrounds a rotor blade of the turbine engine, and the movement means include a smart material having a positive coefficient of thermal expansion (CTE) that is higher than a CTE of each of (a) a first material corresponding to the support means and (b) a second material corresponding to the rotor blade.

14. The casing of claim 13, wherein the movement means is to expand in the radial direction in response to an increase in temperature to cause the support means to move the variable surface means in a radially inward direction, and wherein the movement means is to contract in the radial direction in response to a decrease in temperature to cause the support means to move the variable surface means in a radially outward direction.

15. The casing of claim 12, further including external heat means, the external heat means to cause the change in the temperature of the movement means to cause the movement means to expand.

16. The casing of claim 15, wherein the external heat means include an inflow of a liquid, the liquid having a temperature that is higher than a temperature of the movement means.

17. The casing of claim 16, wherein the liquid includes at least one of lube, oil, or bleed air.

18. The casing of claim 12, further including tip clearance detection means to detect a tip clearance between the variable surface means and a tip of a rotor blade that is radially inward from the variable surface means.

19. A turbine engine comprising:
- a rotor blade extending from a rotor end radially outward to a rotor blade tip;

a substrate surrounding the rotor blade, the substrate having a first surface and a second surface that is radially inward relative to the first surface, the substrate including a trench defined by a recess extending radially outward from the second surface of the substrate to a trench ceiling;

a variable flowpath component positioned at least partially within the trench, the variable flowpath component including:

an actuator structure coupled to the trench ceiling; and a support structure having a material associated with a relatively low coefficient of thermal expansion (CTE), the support structure including (a) a first portion cantilevered from the trench ceiling (b) a second portion operatively coupled to the actuator structure, and (c) a third portion defining a variable surface; and a trench filler positioned in an area of the trench that is not occupied by the variable flowpath component.

20. The turbine engine of claim 19, further including:

a sensor to identify tip clearance, wherein the sensor is communicatively coupled to a controller;

a heat source communicatively coupled to the controller;

wherein the controller is to cause the heat source to increase a temperature of the actuator structure in response to the sensor detecting the tip clearance that is beyond a threshold value; and wherein, in response to the increase in the temperature of the actuator structure, the actuator structure is to radially expand to move the support structure in a radially inward direction to cause the variable surface to move in the radially inward direction to reduce a clearance between the variable surface and the rotor blade tip.

* * * * *